US011875449B2

(12) United States Patent
Takikawa et al.

(10) Patent No.: US 11,875,449 B2
(45) Date of Patent: *Jan. 16, 2024

(54) REAL-TIME RENDERING WITH IMPLICIT SHAPES

(71) Applicant: Nvidia Corporation, Santa Clara, CA (US)

(72) Inventors: Towaki Alan Takikawa, Toronto (CA); Joey Litalien, Quebec (CA); Kangxue Yin, Toronto (CA); Karsten Julian Kreis, Vancouver (CA); Charles Loop, Mercer Island, WA (US); Morgan McGuire, Waterloo (CA); Sanja Fidler, Toronto (CA)

(73) Assignee: Nvidia Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,478

(22) Filed: May 16, 2022

(65) Prior Publication Data
US 2022/0284659 A1    Sep. 8, 2022

Related U.S. Application Data

(63) Continuation of application No. 17/314,182, filed on May 7, 2021, now Pat. No. 11,335,056.

(60) Provisional application No. 63/119,590, filed on Nov. 30, 2020.

(51) Int. Cl.
*G06T 15/08*     (2011.01)
*G06T 17/00*     (2006.01)

(52) U.S. Cl.
CPC ............ *G06T 15/08* (2013.01); *G06T 17/005* (2013.01); *G06T 2210/36* (2013.01)

(58) Field of Classification Search
CPC ... G06T 15/08; G06T 17/005; G06T 2210/36; G06T 15/005; G06T 15/10; G06N 3/045; G06N 3/084; G06N 5/04
See application file for complete search history.

(56) References Cited

U.S. PATENT DOCUMENTS 10,698,562 B1 *   6/2020   Zhou ...................... G06T 15/08
2012/0189178 A1   7/2012   Seong
(Continued)

OTHER PUBLICATIONS

Park, Jeong Joon, et al. "DeepSDF: Learning Continuous Signed Distance Functions for Shape Representation." arXiv preprint arXiv:1901.05103 (Jan. 2019). (Year: 2019).*
(Continued)

Primary Examiner — Daniel F Hajnik
(74) Attorney, Agent, or Firm — Hogan Lovells US LLP

(57) ABSTRACT

Systems and methods are described for rendering complex surfaces or geometry. In at least one embodiment, neural signed distance functions (SDFs) can be used that efficiently capture multiple levels of detail (LODs), and that can be used to reconstruct multi-dimensional geometry or surfaces with high image quality. An example architecture can represent complex shapes in a compressed format with high visual fidelity, and can generalize across different geometries from a single learned example. Extremely small multi-layer perceptrons (MLPs) can be used with an octree-based feature representation for the learned neural SDFs.

20 Claims, 18 Drawing Sheets

(56) References Cited

U.S. PATENT DOCUMENTS

2016/0217369 A1 7/2016 Annapureddy
2021/0279957 A1 9/2021 Eder

OTHER PUBLICATIONS

Tang, Lin, Fei-peng Da, and Yuan Huang. "Compression algorithm of scattered point cloud based on octree coding." 2016 2nd IEEE International Conference on Computer and Communications (ICCC). IEEE, 2016. (Year: 2016).*

Golla, Tim, and Reinhard Klein. "Real-time point cloud compression." 2015 IEEE/RSJ International Conference on Intelligent Robots and Systems (IROS). IEEE, 2015. (Year: 2016).*

NPL Video Titled "CVPR 2019 Oral Session 1-1B: 3D Multiview", available for viewing at: https://www.youtube.com/watch?v=0ILnHe0xbZE, published Jun. 22, 2019, select screenshots included. (Year: 2019).*

Ex Parte Quayle Action issued in U.S. Appl. No. 17/314,182 dated Oct. 14, 2021.

Notice of Allowance issued in U.S. Appl. No. 17/314,182 dated Jan. 28, 2022.

Park, Jeong Joan, et al. "Deepsdf: Learning continuous signed distance functions for shape representation." Proceedings of the IEEE/CVF Conference on Computer Vision and Pattern Recognition. 2019.

Genova, Kyle, et al. "Local Deep Implicit Functions for 3D Shape." arXiv preprint arXiv: 1912.06126 (Jun. 2020).

Jiang, Yue, et al. "SDFDiff: Differentiable Rendering of Signed Distance Fields for 3D Shape Optimization." arXiv preprint arXiv: 1912.07109 (2019).

* cited by examiner

REAL-TIME RENDERING WITH IMPLICIT SHAPES

CROSS-REFERENCE TO RELATED APPLICATIONS

This application is a continuation of U.S. application Ser. No. 17/314,182, filed on May 7, 2021, entitled "Real-Time Rendering With Implicit Shapes", which claims priority to U.S. Provisional Patent Application Ser. No. 63/119,590, filed Nov. 30, 2020, entitled "Real-Time Rendering for Neural-Signed Distance Function," which are hereby incorporated herein in their entirety and for all purposes.

BACKGROUND

In a variety of applications for various industries, it can be desirable to represent three-dimensional objects and shapes in a scene or environment. Three-dimensional (3D) shapes are often represented, or modeled, using a set of polygons (or other shapes, point clouds, or meshes) in a virtual three dimensional space. Another approach that can be utilized to represent shapes involves the use of signed distance functions (SDFs). SDFs are often used with triangle meshes to represent shapes in 3D space, and are functions used to encode the smallest distances to a surface. A benefit to using SDFs is that such representations work well with learning-based tasks, as the functions are continuous such that no assumptions need to be made about the surface topology. Prior approaches typically encode an SDF using a large, fixed-size neural network to approximate complex shapes by their implicit surface. Rendering from large networks is inefficient as it requires many forward passes per pixel or offline conversion to a mesh, which makes these prior representations impractical for real-time graphics.

BRIEF DESCRIPTION OF THE DRAWINGS

Various embodiments in accordance with the present disclosure will be described with reference to the drawings, in which.

DETAILED DESCRIPTION

Figure 1A:
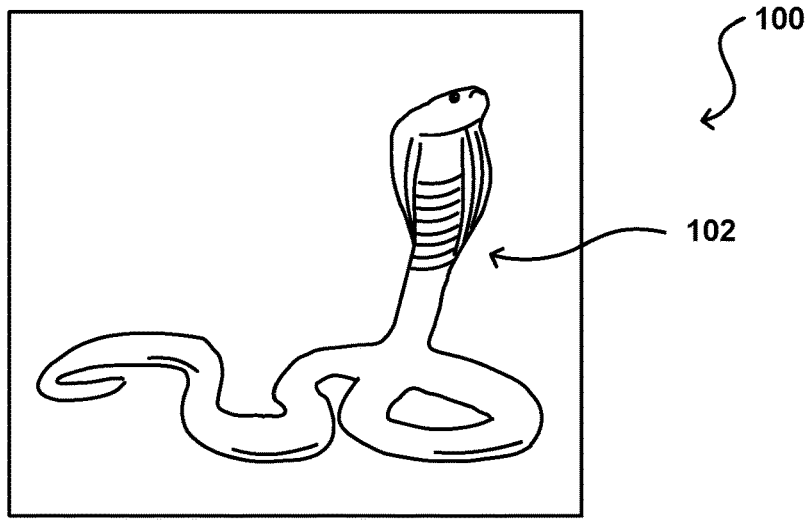
FIGS. 1A, 1B, and 1C illustrate an approach to breaking down a complex shape into a set of relatively simple shapes, according to at least one embodiment.

Approaches in accordance with various embodiments can provide for the rendering of complex shapes and geometries. In particular, various embodiments utilize a neural representation that enables "real-time" rendering of high-fidelity neural signed distance functions (SDFs), while achieving high quality geometry reconstruction and filtering to reduce aliasing of ray samples. Such a system can maintain high levels of detail while executing at interactive rates. In at least one embodiment, a three-dimensional (3D) SDF can be represented using a sparse octree-based feature representation. One or more shapes can then be adaptively fit with multiple discrete levels of detail (LODs) and stored in a single, unified feature volume. These can then be extended to a continuous LOD through linear interpolation of the discrete SDFs. An extremely small multi-layer perceptron (MLP) network can be used to decode the feature volume. An efficient algorithm can be used, in at least one embodiment, to directly render these neural SDF representations in real time with sparse octree traversal and by querying only the necessary LODs.

In at least one embodiment, neural signed distance functions (SDFs) provide an effective representation for three-dimensional (3D) shapes, particularly useful for graphics applications. Neural SDFs are functions of position, which return the nearest distance to the surface for any coordinate, such as may be given by $f(x, y, z)=d$. Neural SDFs have the benefit of being differentiable and smooth, although they may be very slow to render in at least some existing systems. Conventional methods typically encode an SDF using a large, fixed-size neural network to approximate complex shapes with implicit surfaces. As mentioned, rendering using such large networks is computationally expensive since it requires many forward passes through the network for every pixel. Conventional approaches can render SDFs using a sphere tracing algorithm, for example, which performs numerous distance queries along various traced rays. Such a process can be prohibitively expensive for at least some applications if using neural SDFs composed of large MLPs.

Approaches in accordance with various embodiments can instead utilize efficient neural representations that can enable real-time rendering of, for example, high-fidelity neural SDFs. Various embodiments can also provide for this real-time rendering while achieving at least state-of-the-art geometry reconstruction quality. In at least one embodiment, one or more implicit surfaces can be represented using an octree-based feature volume that adaptively fits shapes with multiple discrete levels of detail (LODs), and enables continuous LOD with SDF interpolation. An efficient algorithm can then be used to directly render such a neural SDF representation in real-time by, in at least one embodiment, querying only the necessary LODs with sparse octree traversal. Such a representation can be multiple orders of magnitude more efficient than conventional representations, at least in terms of rendering speed. Such a representation can also produce high quality reconstruction for complex shapes for both 3D geometric and 2D image-space metrics.

Advanced geometric modeling and rendering techniques in computer graphics can utilize 3D shapes with complex details, arbitrary topology, and quality, usually leveraging polygon meshes. However, it is non-trivial to adapt those representations to learning-based approaches since they lack differentiability, and thus cannot easily be used in computer vision applications such as learned image-based 3D reconstruction. As mentioned, neural approximations of signed distance functions (neural SDFs) provide an attractive choice to scale up computer vision and graphics applications. Neural networks can encode accurate 3D geometry without restrictions on topology or resolution by learning the appropriate SDF, which can define a surface by its zero level-set. A large, fixed-size multi-layer perceptron (MLP) can be utilized as the learned distance function. Directly rendering and probing neural SDFs can utilize an approach such as sphere tracing, a root-finding algorithm that can require hundreds of SDF evaluations per pixel to converge. As a single forward pass through a large MLP-based SDF can require millions of operations, neural SDFs quickly become impractical for real-time graphics applications as the cost of computing a single pixel inflates to hundreds of millions of operations. One or more small neural networks may be utilized to overfit single shapes, but this often comes at the cost of generality and reconstruction quality. Fixed-size neural networks may be utilized, but these may then be unable to express geometry with complexity exceeding the capacity of the network.

Accordingly, approaches in accordance with various embodiments can utilize representations for neural SDFs that can adaptively scale to different levels of detail (LODs) and reconstruct highly detailed geometry. Such an approach can smoothly interpolate between different scales of geometry, and can be rendered in real-time with a reasonable memory footprint. In at least some embodiments, a small multi-layer perceptron (MLP) can be used to make sphere tracing practical without sacrificing quality or generality. Such an approach can build on surface extraction mechanisms that utilize quadrature and spatial data structures storing distance values to finely discretize the Euclidean space such that simple, linear basis functions can reconstruct the geometry. In various embodiments, this space can be discretized using a sparse voxel octree (SVO), with learned feature vectors being stored instead of signed distance values. These vectors can be decoded into scalar distances using a shallow MLP, for example, enabling the tree depth to be truncated while inheriting advantages of other approaches, such as LOD. A ray traversal algorithm can be utilized that is tailored to such an architecture, allowing geometry to be rendered at, or above, 100 times faster than various conventional approaches. An architecture for providing such functionality can also represent 3D shapes in a compressed format with higher visual fidelity than traditional methods, while generalizing across different geometries even from a single learned example. Such architecture can also serve as a modular building block for many downstream applications, such as scene reconstruction from images, robotics navigation, and shape analysis.

At least some embodiments can represent one or more implicit surfaces using an octree-based feature volume that adaptively fits shapes with multiple discrete levels of detail (LODs). A level of detail (LOD) in computer graphics refers to one or more 3D shapes that are filtered to limit feature variations, such as to approximately twice the pixel size in image space. Such filtering can help to mitigate issues such as flickering caused by aliasing, as well as to accelerate rendering by reducing model complexity. While signal processing techniques can filter textures, geometry filtering is typically representation-specific and challenging. One potential approach would be to utilize mesh decimation, where a mesh is simplified to a budgeted number of faces, vertices, or edges. Conventional methods accomplish this by greedily removing mesh elements with the smallest impact on geometric accuracy. Other approaches optimize for perceptual metrics or focus on simplifying topology. Meshes suffer from discretization errors under low memory constraints and have difficulty blending between LODs. In contrast, SDFs can represent smooth surfaces with less memory, and can smoothly blend between LODs to reduce aliasing. Neural SDFs can inherit these and other beneficial properties.

Implicit surface-based methods can encode geometry in latent vectors or neural network weights, which parameterize surfaces through level-sets. These "iso-surfaces" can be learned by, for example, encoding the shapes into latent vectors using an auto-decoder. In this context, an auto-decoder can comprise a large MLP which outputs a scalar value conditional on the latent vector and position. Similarly, periodic functions can be used that result in large improvements in reconstruction quality. Certain conventional approaches focus on rendering neural implicit representations. For example, a differentiable renderer for implicit surfaces can utilize ray marching, and differentiable renderers for SDFs can utilize a process such as sphere tracing. These differentiable renderers can be agnostic to the ray-tracing algorithm, in that they only require differentiability with respect to the ray-surface intersection. Approaches in accordance with various embodiments can enable levels of detail and use sphere tracing, which allows separating out the geometry from shading and therefore optimize ray tracing, something not possible in a volumetric rendering framework.

Figure 1B:
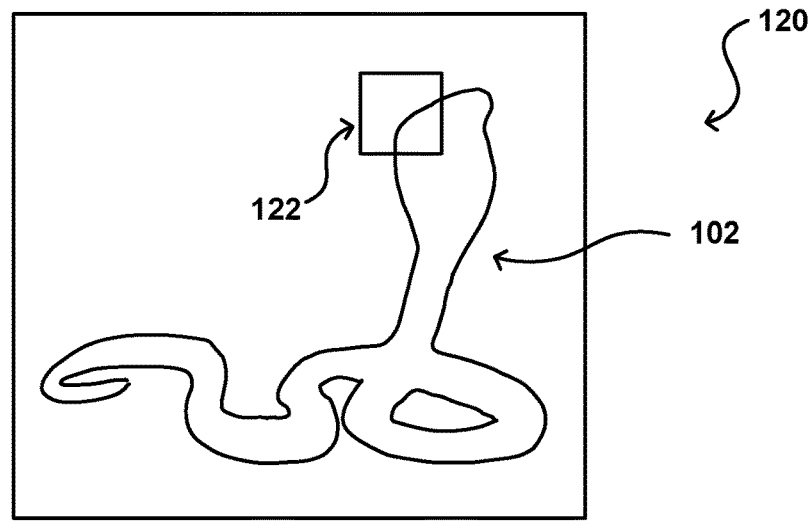

A system in accordance with at least one embodiment can reconstruct detailed geometry and enable continuous level of detail (LOD), all while being able to render at interactive rates. FIGS. 1A-C and 2 illustrate a visual overview of an example process that can be utilized in such a system. An example image 100 in FIG. 1A illustrates a relatively complex shape 102, here the shape of a snake, that can be in two or three dimensions. As mentioned, it can be difficult to represent the shape of the snake by encoding an SDF and using a large, fixed-size neural network to approximate this complex shape by its implicit surface, particularly if this complex shape needs to be rendered quickly for applications such as "real-time" graphics, such as for gaming where frames of content may have to be sent and/or displayed at frame rates such as 60 frames per second (fps) or more. Accordingly, approaches presented herein can break down this complex surface into a set of smaller surfaces, which can each be processed using a respective, and much smaller, neural network. This can include breaking down an image into a grid with a set of cells (e.g., voxels), and using a neural network for individual portions of the surface represented in each cell. For example, the image 120 in FIG. 1B illustrates an example cell 122 that can be selected that includes a portion of the complex surface. As illustrated in the cell view

Figure 1C:
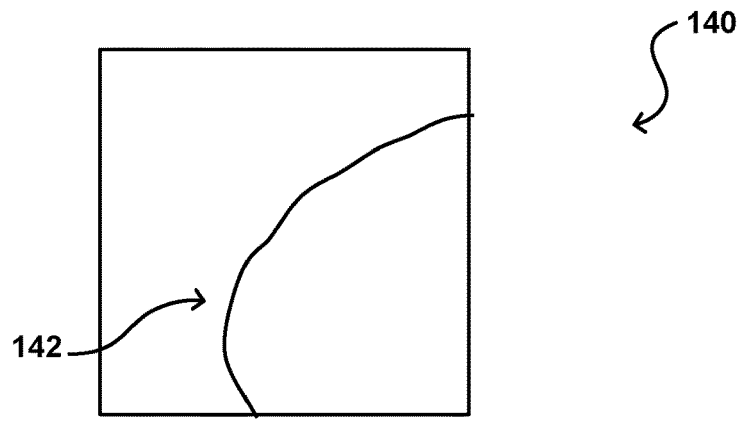

140 of FIG. 1C, the portion of the surface in this cell is much simpler, and can be more easily approximated using, for example, a neural SDF.

At least one embodiment can take advantage of SDFs that are functions $f: \mathbb{R}^3 \to \mathbb{R}$ where $d=f(x)$ is the shortest signed distance from a point x to a surface $S = \partial \mathcal{M}$ of a volume $\mathcal{M} \in \mathbb{R}^3$, where the sign indicates whether x is inside or outside of $\mathcal{M}$. As such, S is implicitly represented as the zero level-set off as may be given by:

$$S = \{x \in \mathbb{R}^3 | (x) = 0\}$$

A neural SDF can encode the SDF as the parameters $\theta$ of a neural network $f_a$. Retrieving the signed distance for a point $x \in \mathbb{R}^3$ amounts to computing $f_\theta(x) = d$. The parameters $\theta$ are optimized with the loss $J(\theta) = E_{x,d} \mathcal{L}(f_\theta(x), d)$, where d is the ground-truth signed distance and $\mathcal{L}$ is some distance metric such as $\mathcal{L}$-distance. An optional input "shape" feature vector z E can be used to condition the network to fit different shapes with a fixed $\theta$.

To render neural SDFs directly, ray-tracing can be performed using a root-finding algorithm, such as sphere tracing. Such an algorithm can perform up to a hundred distance queries per ray in some implementations, making standard neural SDFs prohibitively expensive if the network is large and the distance query is too slow. Using small networks can speed up this iterative rendering process, but the reconstructed shape may be inaccurate. Moreover, fixed-size networks are unable to fit highly complex shapes and cannot adapt to simple or far-away objects where visual details are unnecessary.

Figure 2:
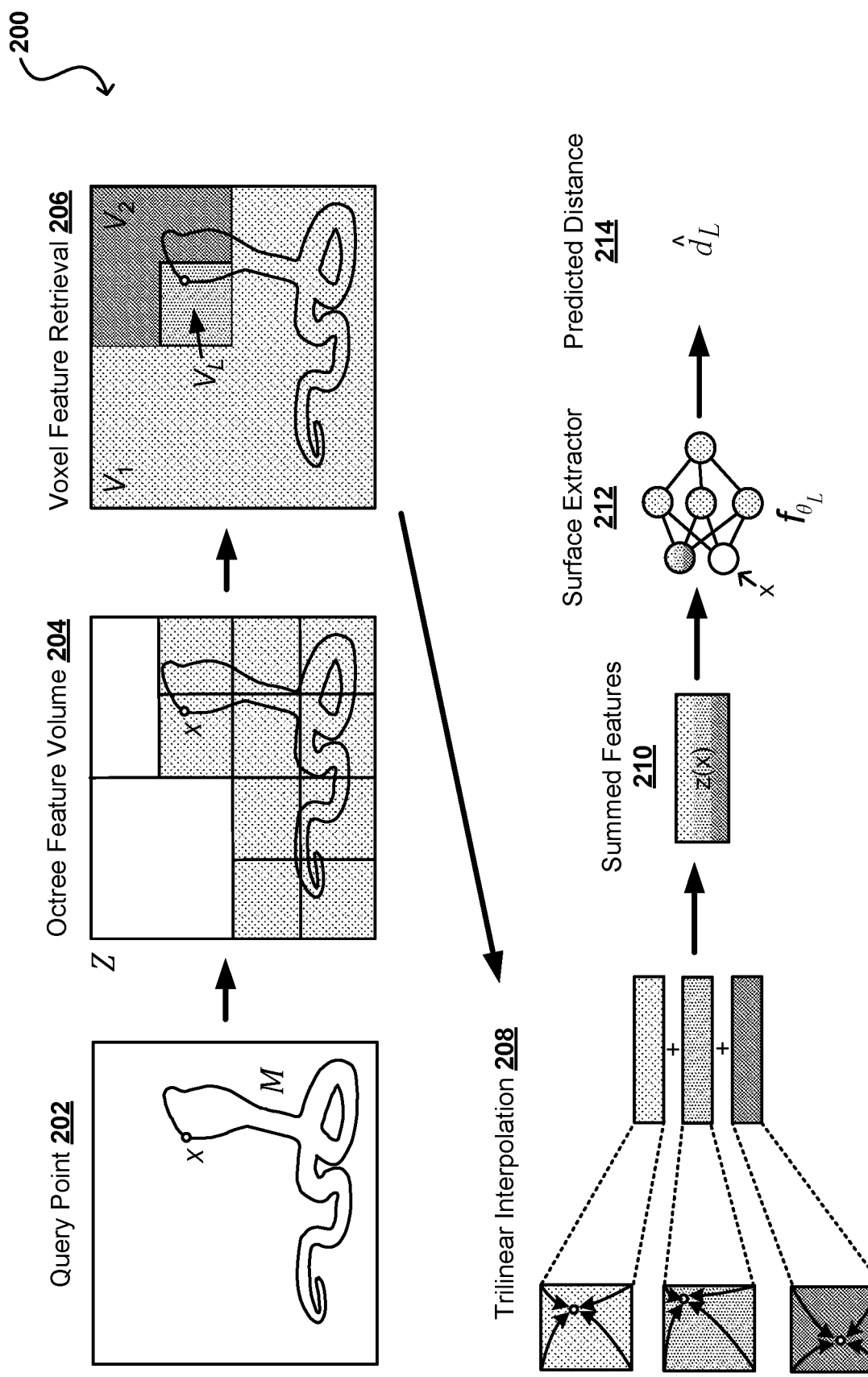
FIG. 2 illustrates an example architecture for encoding an SDF using a sparse voxel octree, according to at least one embodiment.

A framework can be utilized that addresses these and other such issues by encoding the SDF using a sparse voxel octree, allowing the representation to adapt to different levels of detail and to use shallow neural networks to encode geometry whilst maintaining geometric accuracy. FIG. 2 illustrates data 200 at various steps of such a process. At least one embodiment can utilize neural SDFs using parameters of a neural network and an additional learned input feature which encodes the shape. Instead of encoding shapes using a single feature vector z, a feature volume 204 can be used which contains a collection of feature vectors, which can be denoted by Z. In at least one embodiment, Z can be stored in a sparse voxel octree (SVO) spanning the bounding volume $\mathcal{B} = [-1,1]$. Each voxel V in the SVO holds a learnable feature vector $z_V^{(j)}$ at each of its eight corners (indexed by j), which are shared if neighbor voxels exist. Voxels are allocated only if the voxel V contains a surface, making the SVO sparse.

Each level $L \in \mathbb{N}$ of the SVO defines a LOD for the geometry. As the tree depth L in the SVO increases, the surface is represented with finer discretization, allowing reconstruction quality to scale with memory usage. A maximum tree depth can be denoted as $L_{max}$. An approach in accordance with at least one embodiment can employ small MLP neural networks $$f_{\theta_{1:L_{max}}}$$

denoted as decoders, with parameters $\theta_{1:L_{max}} = \{\theta_1, \ldots, \theta_{L_{max}}\}$ for each LOD. These MLPs, which are essentially small feed-forward neural networks, can learn the mappings between input points and distances to a surface.

An image showing a selected query point 202 x for the surface is illustrated in FIG. 2. To compute an SDF for a query point $x \in \mathbb{R}^3$ at the desired LOD L, the tree can be traversed up to level L to find all voxel $V_{1:L} = \{V_1, \ldots, V_L\}$ containing x. For each level $\ell \in \{1, \ldots, L\}$, a per-voxel shape vector $\psi(x; \ell, z)$ is computed by tri-linearly interpolating the corner features of the voxels at x. These features can be summed across the levels to get $z(x;L,z) = \sum_{\ell=1}^{L} \psi(x; \ell, z)$, and pass them into the MLP with LOD-specific parameters $\theta_L$. In one or more embodiments, the SDF is computed as:

$$\hat{d}_L = f_{\theta_L}([x, z(x; L, z)]),$$

where $[\cdot, \cdot]$ denotes concatenation. This summation across LODs allows meaningful gradients to propagate across LODs, helping especially coarser LODs.

Since these shape vectors $z_V^{(j)}$ now only represent small surface segments instead of entire shapes, the computational complexity can be moved out of the neural network A and into the feature vector query $\psi: \mathbb{R}^3 \to \mathbb{R}^m$, which amounts to an SVO traversal and a trilinear interpolation of the voxel features. Such a design allows for use of very small MLPs, enabling significant speed-ups without sacrificing reconstruction quality.

As illustrated in FIG. 2, the neural SDF is encoded using a sparse voxel octree (SVO) 204 which holds a collection of features Z. The levels of the SVO define LODs, and the voxel corners contain feature vectors defining local surface segments. Given query point x 202 and LOD L, corresponding voxels $V_{1:L}$ can be located, and their corners $z_V^{(j)}$ can undergo trilinear interpolation 208 up to L and summed to obtain a summed feature vector $z(x)$ 210. Together with x, this summed feature vector can be fed into a small MLP $f_{\theta_L}$, or feature extractor 212, to obtain a signed distance $\hat{d}_L$, or predicted distance 214.

Although the levels of this example octree are discrete, such a process can smoothly interpolate between these levels. To obtain a desired continuous LOD $\tilde{L} \geq 1$, a blending process can be used that blends between different discrete octree LODs L by linearly interpolating the corresponding predicted distances:

$$\hat{d}_{\tilde{L}} = (1-\alpha)\hat{d}_{L^*} + \alpha \hat{d}_{L^*+1}$$

where $L^* = \lfloor \tilde{L} \rfloor$ and $\alpha = \tilde{L} - \lfloor \tilde{L} \rfloor$ is the fractional part, allowing for a smooth transition between LODs. This simple blending scheme can be used for SDFs, but may not work well for at least density or occupancy in some situations, and may be ill-defined for certain meshes or point clouds. In at least some embodiments, a continuous LOD $\tilde{L}$ can be set at render-time as discussed subsequently herein.

An attempt can be made in at least some embodiments to ensure that each discrete level L of the SVO represents valid geometry by jointly training each LOD. This can be accomplished in one example by computing individual losses at each level and summing them across levels, as may be given by:

$$J(\theta, z) = \mathbb{E}_{x,d} \sum_{L=1}^{L_{max}} \left\| f_{\theta_L}([x, z(x, L, z)]) - d \right\|^2$$

The loss function can then be stochastically optimized with respect to both $\theta_{1:L_{max}}$ and z. The expectation can be estimated with importance sampling for the points $x \in \mathcal{B}$. Samples can be used from a mixture of three distributions: uniform samples in B, surface samples, and perturbed surface samples.

In one example training process, training was performed using an NVIDIA Tesla V100 GPU using PyTorch with some operations implemented in CUDA. Models were trained with an Adam optimizer with a learning rate of 0.001, using a set of 500 000 points sampled at every epoch with a batch size of 512. These points were distributed in a 2:2:1 split of area-weighted surface samples, perturbed surface samples with Gaussian noise with a-=0.01, and uniform random points in the bounding volume $B=[-1, 1]^3$, respectively. The representation was trained summing together the loss functions of the distances at each LOD. One example training process used $L^2$-distance for the loss. For ShapeNet150 and Thingi32, all LODs were trained jointly. For TurboSquid16 a progressive scheme was used where the highest LOD first is trained first, and a new trainable level £-1 added every 100 epochs. This training scheme slightly benefits lower LODs for more complex shapes. Experimentation was also performed with different choices of hyper-parameters for different architectures (notably for the baselines), but it was observed that these sets of hyperparameters worked well across all models.

In at least one embodiment, training can start with base shapes, such as meshes. A triangular mesh can be used that has no inner triangle, and is effectively a shell around an object. Once this shape is obtained, its surface and surroundings can be sampled. This can be accomplished by constructing some sort of distribution over the triangles and sampling, for example, 100,000-200,000 points on, or near, the surface. In at least one embodiment there are different categories of points for input to the neural network. These can include surface points, where a point lies on one of the triangles, as well as near surface points, such as points on the surface that can be perturbed using some Gaussian noise so they are not directly on the surface. A uniform point sampling process can be used, where points are in the unit cube and used as training points. There is also an octree feature volume, which includes several different levels. Every corner of the voxels at every resolution can store a small feature vector that it can also perturb with Gaussian noise. This can be initialized in a sparse fashion, where voxels are not initialized if they do not contain some type of surface.

This octree feature volume and these determined points can be used to determine the voxel(s) to which each point belongs. This can be used with a large number of points during training. For any point x, a determination is made as to the voxel(s) that contains that point. In FIG. 2, it is illustrated that there may be multiple voxels at different resolutions that contain this point x. In the figure, V(L) would be the lowest resolution voxel, and V(1) would be the largest resolution voxel. The system can take the coordinates of these voxel corners in 3D space, and perform trilinear interpolation of the features at these corners for every resolution. The system can weight, based at least in part upon the distance, the different feature vectors at these corners. This can be performed separately for all the voxels of each level or resolution. This can result in three feature vectors that were interpolated, which then can be summed together. This then produces a fixed dimensional feature vector, which can be referred to as containing multi-level features or summed features, and this is the input to a small MLP as discussed. The vector may be multi-dimensional, such as 32 dimensional in one embodiment. The inputs to the NN, which in FIG. 2 is referred to as a surface extractor, include the input x, concatenated to feature θ, may be of higher dimension. This can be passed to a small MLP, such as a single layer MLP, which produces a predicted distance. This predicted distance can be compared to the ground truth distance for that point during training. If the point lies on the surface the ground truth distance should be roughly zero. If the distance is not zero, an L2 distance loss can be calculated and back-propagation can be performed to update the network parameters as appropriate. This process can be repeated for every point in the point cloud to optimize the feature vectors at every corner.

Figure 3:
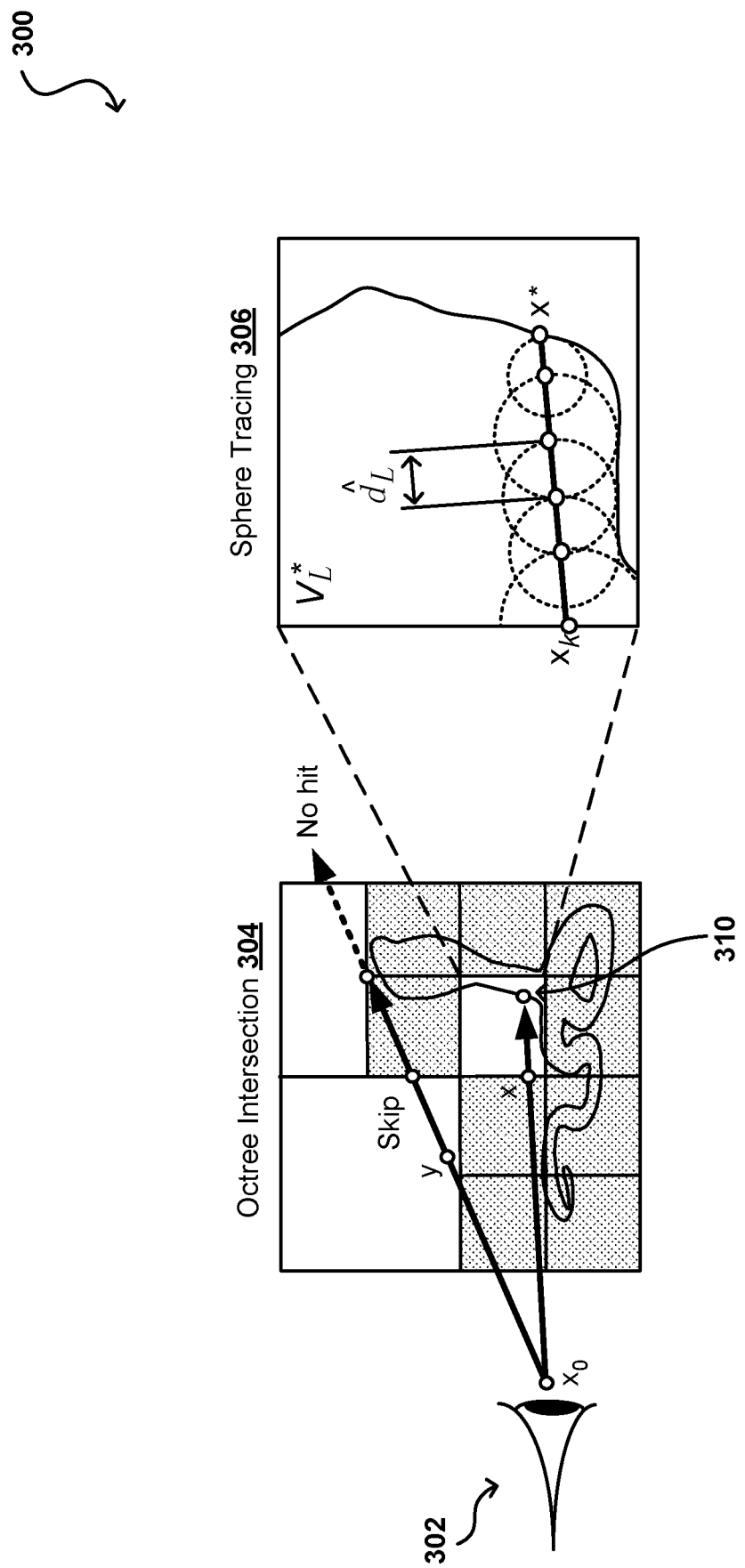
FIG. 3 illustrates an adaptive ray-based approach, according to at least one embodiment.

In at least one embodiment, sphere tracing can be used to directly render a representation, such as illustrated in the example approach 300 of FIG. 3. Rendering an SVO-based SDF using sphere tracing, however, may not be straightforward for some implementations at least because typical SDFs are defined on all of $\mathbb{R}^3$. In contrast, SVO SDFs in accordance with at least one embodiment are defined only for voxels V which intersect the surface geometry. Therefore, proper handling of distance queries made in empty space can be required. One option is to use a constant step size, such as ray marching, but there is no guarantee the trace will converge because the step may overshoot.

Instead, at the beginning of the frame in at least one embodiment, a ray-SVO intersection (details below) can be performed to retrieve every voxel V at each resolution $\ell$ that intersects with the ray. Formally, if $r(t)=x_0+td$, $t>0$ is a ray with origin $x_0 \in \mathbb{R}^3$ and direction $d \in \mathbb{R}^3$ then let $V_\ell(r)$ denote the depth-ordered set of intersected voxels by r at level $\ell$. Each voxel in $V_\ell(r)$ can contain the intersected ray index, voxel position, parent voxel, and pointers to the eight corner feature vectors $z_V^{(j)}$. Pointers can be retrieved instead of feature vectors to save memory in at least some embodiments. The feature vectors can be stored in a flattened array, with the pointers being precalculated in an initialization step by iterating over all voxels and finding corresponding indices to the features in each corner.

Adaptive ray stepping can be performed in at least some embodiments, as illustrated in FIG. 3. For a given ray in a sphere trace iteration k, a ray-AABB intersection can be performed against the voxels in the target LOD level L to retrieve the first voxel $V_L^* \in V_L(r)$ that hits, as illustrated for octree intersection 304 for a pair of example rats. If $x_k \notin V_L^*$, then the process can advance x to the ray-AABB intersection point 310. If $x_k \in V_L^*$, the process can query the feature volume. All parent voxels $V_L^*$ corresponding to the coarser levels $\ell \in \{1, \ldots, L-1\}$ can be recursively retrieved, resulting in a collection of voxels $V_{1:L}^*$. The tri-linearly interpolated features can then be summed at each node. It can be noted that the parent nodes always exist by construction in at least one embodiment. The MLP $f_{\theta_L}$ then produces a conservative distance $\hat{d}_i$, to move in direction d, as illustrated for sphere tracing 306 along the relevant portion of the surface, and a standard sphere tracing step can be taken, as may be given by: $x_{k+1} \leftarrow x_k + \hat{d}_L d$.

If $x_{k+1}$ is now in empty space, the process can skip to the next voxel in $V_L(r)$ along the ray and discard the ray r if none exists. If $x_{k+1}$ is inside a voxel, a sphere trace step can be performed. This process can repeat until all rays miss or a stopping criterion is reached to recover a hit point $x^* \in S$ as illustrated in FIG. 3. This adaptive stepping enables voxel sparsity by never having to query in empty space, allowing a minimal storage for our representation.

In at least one embodiment, as illustrated in FIG. 3, when the query point is inside a voxel (e.g., x), trilinear interpolation can be performed on all corresponding voxels up to the base octree resolution to compute a sphere tracing step 306. When the query point is outside a voxel (e.g., y), ray-AABB intersection can be used to skip to the next voxel. In at least one embodiment, a sparse ray-octree intersection algorithm can be utilized that makes use of a breadth-first traversal strategy and parallel scan kernels to achieve high performance on modern graphics hardware. Algorithm 1 provides pseudocode of one such algorithm.

| Algorithm 1 Iterative, parallel, breadth-first octree traversal |
|---|
| 1:         procedure RayTrace Octree $(\mathcal{L}, \mathcal{R})$ |
| 2:         $N_i^{(0)} \leftarrow \{i, 0\}, i = 0, \ldots |\mathcal{R}| - 1$ |
| 3:         for $\ell = 0$ to L do |
| 4:             D $\leftarrow$ Decide($\mathcal{R}, N^{(\ell)}$, D, S) |
| 5:             S $\leftarrow$ ExclusiveSum(D) |
| 6:             if $\ell = L$ then |
| 7:                 $N^{(\ell)} \leftarrow$ Compatify($N^{(\ell)}$, D, S) |
| 8:             else |
| 9:                 $N^{(\ell+1)} \leftarrow$ Subdivide($N^{(\ell)}$, D, S) |

This algorithm first generates a set of rays $\mathcal{R}$ (indexed by i) and stores them in an array $N^{(0)}$ of ray-voxel pairs, which are proposals for ray-voxel intersections. The algorithm can initialize each $N_i^{(0)} \in N^{(0)}$ with the root node, the octree's top-level voxel (line 2). Next, the algorithm iterates over the octree levels $\ell$ (line 3). In each iteration, the algorithm determines the ray-voxel pairs that result in intersections in DECIDE, which returns a list of decisions D with Dj=1 if the ray intersects the voxel and Dj=0 otherwise (line 4). Then, the algorithm uses EXCLUSIVESUM to compute the exclusive sum S of list D, which is then fed into the next two subroutines (line 5). If the algorithm has not yet reached a desired or target LOD level L, the algorithm can use SUBDIVIDE to populate the next list $N^{(\ell+1)}$ with child voxels of those $N_j^{(\ell)}$ that the ray intersects, and continue the iteration (line 9). Otherwise, the algorithm can use COMPACTIFY to remove all NP) that do not result in an intersection (line 7). The result of this example algorithm is a compact, depth-ordered list of ray-voxel intersections for each level of the octree. It can be noted that by analyzing the octant of space that the ray origin falls into inside the voxel, the child voxels can be ordered so that the list of ray-voxel pairs $N^{(L)}$ will be ordered by distance to the ray origin. The LOD L can be chosen for rendering with a depth heuristic, where L transitions linearly with user-defined thresholds based on distance to object.

Several experiments have been performed to showcase the effectiveness of such an architecture. In one example, a model was first fit to 3D mesh models from datasets including ShapeNet, Thingi10K, and select models from TurboSquid, and evaluated based on both 3D geometry-based metrics as well as rendered image-space metrics. It was demonstrated that such a model is able to fit complex analytic signed distance functions with unique properties from Shadertoy. Results were also obtained on real-time rendering, generalization to multiple shapes, and geometry simplification. The MLP used in this experiment had only a single hidden layer with dimension h=128 with a ReLU activation in the intermediate layer, thereby being significantly smaller and faster to run than networks used in the baselines for comparison. At least one experiment used an SVO feature dimension of m=32, with voxel features being initialized using a Gaussian prior with σ=0.01.

In at least one experiment, the inference performance of such an architecture was also evaluated, both with and without a rendering algorithm in accordance with at least one embodiment. The performance was first evaluated using a naive Python-based sphere tracing algorithm in PyTorch, with the same implementation across all baselines for fair comparison. For the Python version of the representation used in the experiment and in accordance with one or more embodiments of the present disclosure, the features were stored on a dense voxel grid, since a naive sphere tracer cannot handle sparsity. For the optimized implementation, the performance of this representation was demonstrated using a renderer implemented using libtorch. CUB, and CUDA. It was observed that both the naive PyTorch renderer and sparse-optimized CUDA renderer perform better than the baselines. In particular, the sparse frametimes are more than 100× faster than DeepSDF while achieving better visual quality with less parameters. It was also observed that frame times decrease significantly as LOD decreases for a naive renderer but less so for an optimized renderer. This is at least partially due to the fact that the bottleneck of the rendering is not in the ray-octree intersect—which is dependent on the number of voxels— but rather in the MLP inference and miscellaneous memory I/O.

It was also observed that such a surface extraction mechanism can generalize to multiple shapes, even from being trained on a single shape. This is important because loading distinct weights per object as in incurs large amounts of memory movement, which is expensive. With a general surface extraction mechanism, the weights can be pre-loaded and multi-resolution voxels can be streamed-in on demand. It was observed that such a representation fares better, even against large networks that are over-fitting to each specific shape examples. At the lowest LOD, the surface extractor struggles to reconstruct good surfaces, as expected; the features become increasingly high-level and complex for lower LODs.

Experimentation was also performed to evaluate how low LODs perform against classic mesh decimation algorithms, in particular edge collapse in libigl. One experiment compared against mesh decimation instead of mesh compression algorithms because the model can also benefit from compression and mesh decoding incurs additional runtime cost. One experiment first evaluated memory impact. A conservative face budget was calculated to benefit the mesh representation. It was observed that as the memory budget decreases, the relative advantage on the perceptual quality of such a method increases, as evidenced by the image-based normal error. The SDF can represent smooth features easily, whereas the mesh may suffer from discretization errors as the face budget decreases. Such a representation can also smoothly blend between LODs by construction, something often difficult to do with meshes.

Architectures utilizing such neural SDFs may be particularly attractive for applications such as content creation. Modern games and movies can have very complicated and detailed assets. It is very expensive to generate these assets, as a developer typically has to hire artists who take a lot of time to generate high-quality assets. If differentiable rendering can be used with signed distance functions, where those SDFs are already differentiable, a set of multi-view images can be used to generate actual 3D object representations, which has advantages for content creation tasks. Because this representation is differentiable, it can be fit inside a generative model or other such generator. There can be another neural network, such as a generative adversarial network (GAN) that generates these 3D shapes. During training, a NN-based discriminator can be used to determine whether this shape really appears like a realistic 3D object.

Such a system can be used with a primary representation in production. As mentioned earlier, these neural SDFs have the benefit that they are very efficient in memory. If an application is bounded mostly by memory, but not necessarily by compute, a developer might be willing to pay the higher cost to render these objects as long as the developer can get lower memory bandwidth.

Such an approach can also find use in applications such as robotics or automation, where there may be limited on-board memory. This may be useful for devices such as autonomous (or semi-autonomous) vehicles or robots, such as those in warehouses. Applications may also be found in areas such as distributed or cloud rendering, where there may be many different different nodes working together to render a scene, and one of the things that is very expensive is communicating between nodes. Such an approach can be used to syncing together different asset sizes, as well as to compress these assets in a much more efficient space efficient format. Since such an approach will save compute resources anyway by distributing the workload across several different nodes, there may be a bigger gain by saving memory than saving compute.

Figure 4:
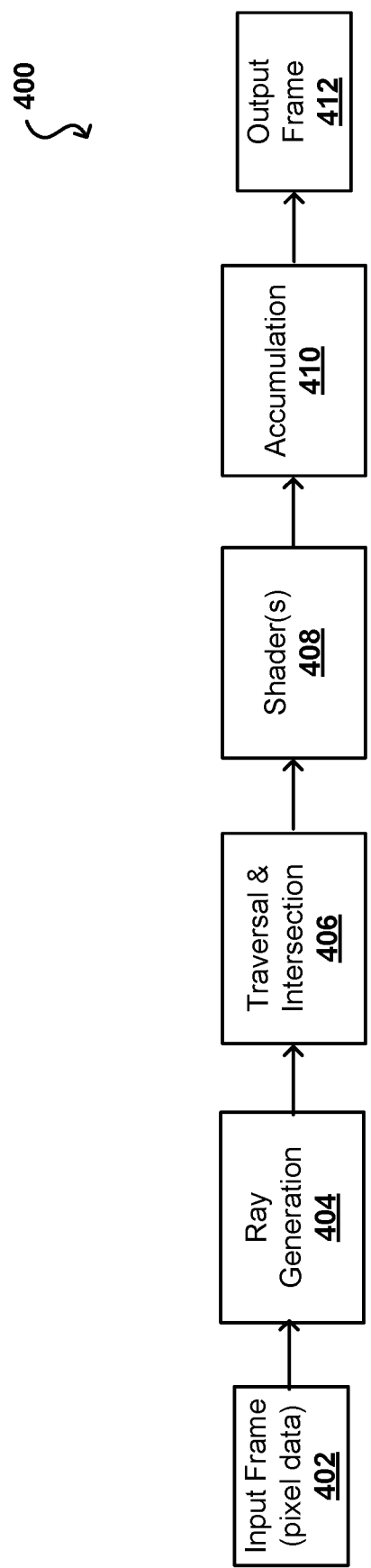
FIG. 4 illustrates and example rendering pipeline, according to at least one embodiment.

FIG. 4 illustrates an example rendering pipeline 400 that can be used to render images or frames using processes such as those discussed herein. In this example, scene data 402 for a current frame to be rendered can be received as input to a ray generation component 404 of a ray tracer. The result of the ray tracer can be used as input to a traversal and intersection analysis component 406. In at least some embodiments, this can be used to identify query points for analysis. As mentioned, such a component can identify the intersection points of various rays with one or more surfaces in the frame, as may be due at least in part to incidence, obstruction, reflection, or refraction. The surfaces can be represented using one or more distance functions as discussed herein. This information can be provided to one or more shaders 408, which can set the pixel colors for the various pixels of the frame based at least in part upon this lighting and intersection information (along with other information such as color, texture, and so on). The results can be accumulated by an accumulation module 410 or component for generating an output frame 412 of a desired size, resolution, or format.

Figure 5A:
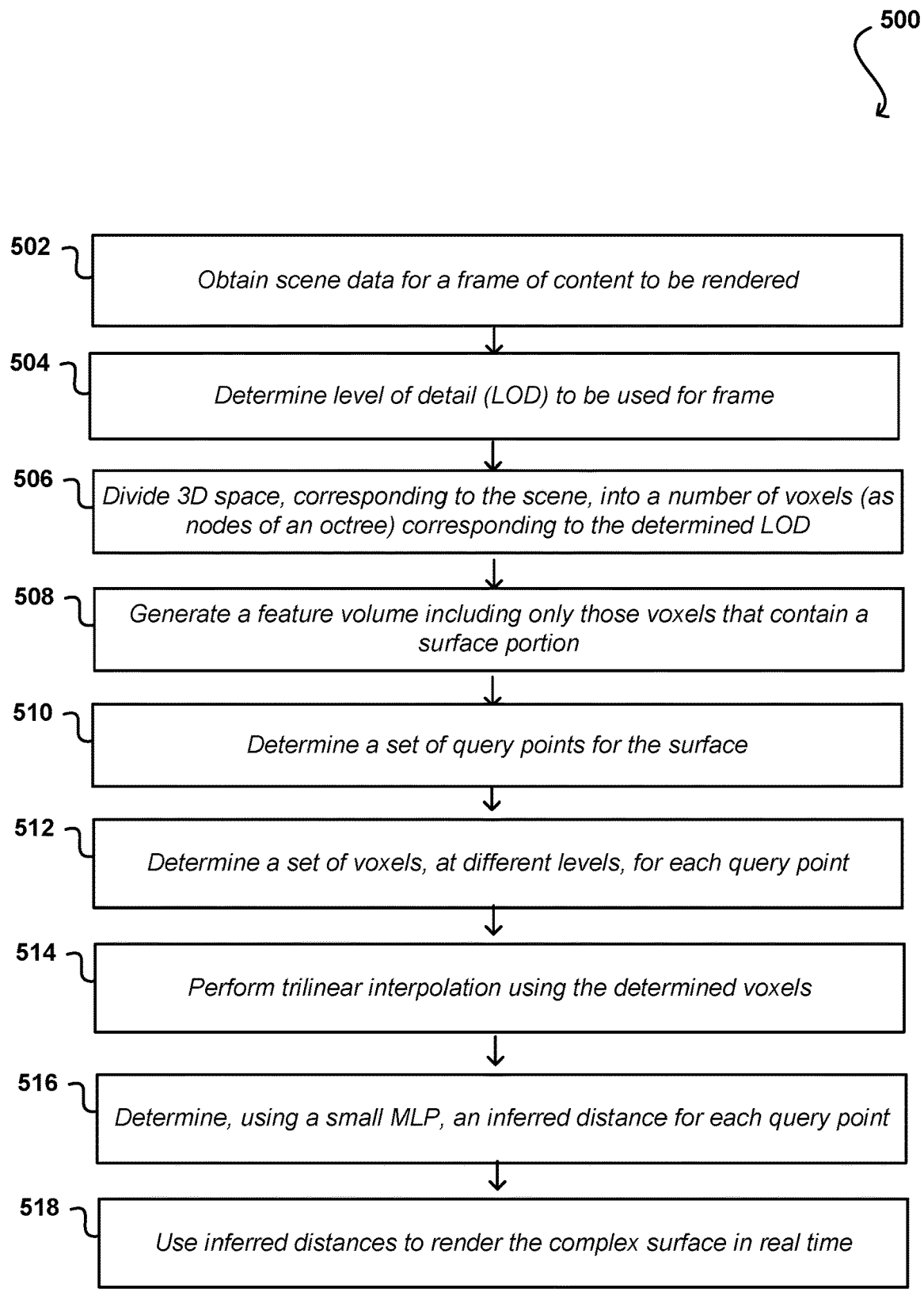
FIGS. 5A and 5B illustrate processes for rendering a complex surface, according to at least one embodiment.

FIG. 5A illustrates an example process 500 that can be used to render a complex surface in accordance with at least one embodiment. It should be understood that for this and other processes presented herein that there may be additional, fewer, or alternative steps performed in similar or alterative orders, or at least partially in parallel, within the scope of the various embodiments unless otherwise specifically stated. In this example, scene data is obtained 502 for a frame of content to be rendered. This may be a frame in a sequence of video or animation, or a single image, among other such options. For this scene (or video sequence, etc.), a level of detail (LOD) to be utilized can be determined 504. The three-dimensional (or other dimensional) space can be divided 506 into a number of voxels, each representing a node in a level of an octree or other hierarchical representation, corresponding to the determined LOD. A feature volume can then be generated 508, or otherwise determined, that includes only those voxels at each level that contain a surface portion. A set of query points can then be determined 510 for the surface. As mentioned, this may be performed using ray tracing to identify intersection points with one or more surface portions. A set of voxels can then be determined 512, for the various levels of the octree, for each of the determined query points. Trilinear interpolation can be performed 514 using the feature data from the determined voxels, and an inferred distance can be determined 516, using a small MLP or other such network. These inferred distances can then be used 518 to render this complex surface in the current frame and in real time.

Figure 5B:
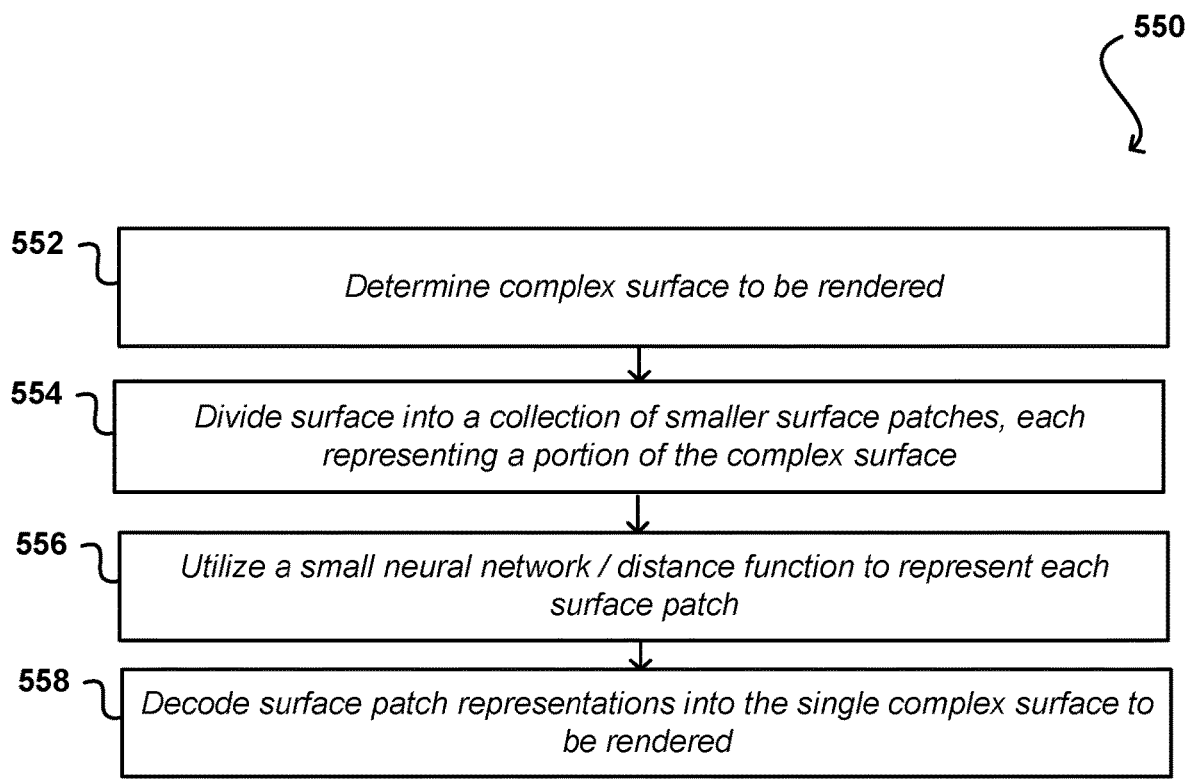

FIG. 5B illustrates another example process for rendering a surface that can be utilized in accordance with various embodiments. In this example, a complex surface to be rendered is determined 552, where the "complexity" of a surface may be determined based upon factors such as size, shape, and variation, among other such options. In some embodiments, a complexity threshold may be utilized to determine whether a shape is complex, such that this process should be utilized. This complex surface can be divided 554 into a collection of smaller surface patches, where each surface patch represents a portion of the complex surface. A small neural network and/or distance function can be utilized 556 to represent each surface patch. These surface patches can then be decoded 558 into a single representation of the complex surface and used to render that surface.

In at least one embodiment, the level of detail (LOD) for an object may be determined on a per-frame basis, or at least may vary over time. This may be advantageous in at least some applications because an object may represent different levels of detail or complexity over time. For example, a tree that is far off in the distance may be represented by a relatively simple outline. As that tree approaches a virtual camera, however, the complexity or level of detail will increase, such as to the point where individual leaves and branches can be resolved. As such, it can be advantageous to adjust the LOD for this tree at different times in the rendering process. Such a process can conserve resources by only using an appropriate level of detail for objects in a scene, and reducing that level of detail as appropriate. A user or developer may also be able to set values or ranges for levels of detail for certain objects or portions of a scene, such as to only use up to a maximum LOD for background objects or a certain type of object, etc. Different versions of an object may also be rendered at these different LODs, and such an approach allows for a smooth interpolation between levels. Such an approach can scale with memory and complexity, and can allow a system to spend resources where they will make the largest impact.

As discussed, various approaches presented herein are lightweight enough to execute on a client device, such as a personal computer or gaming console, in real time. Such processing can be performed on content that is generated on that client device or received from an external source, such as streaming content received over at least one network. The source can be any appropriate source, such as a game host, streaming media provider, third party content provider, or other client device, among other such options. In some instances, the processing and/or rendering of this content may be performed by one of these other devices, systems, or entities, then provided to the client device (or another such recipient) for presentation or another such use.

Figure 6:
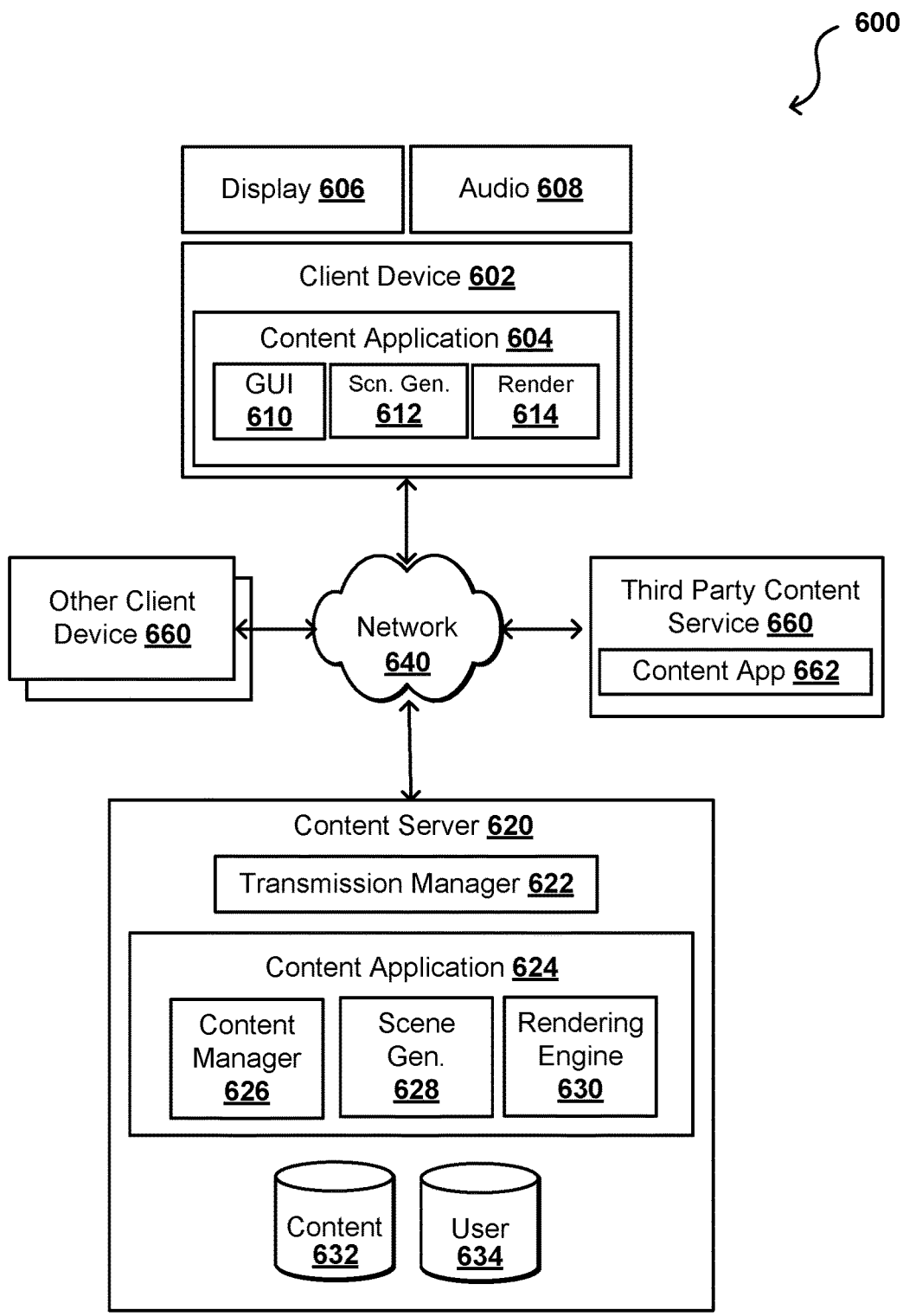
FIG. 6 illustrates components of a system for generating image data, according to at least one embodiment.

As an example, FIG. 6 illustrates an example network configuration 600 that can be used to provide, generate, or modify content. In at least one embodiment, a client device 602 can generate content for a session using components of a content application 604 on client device 602 and data stored locally on that client device. In at least one embodiment, a content application 624 (e.g., an image generation or editing application) executing on content server 620 (e.g., a cloud server or edge server) may initiate a session associated with at least client device 602, as may utilize a session manager and user data stored in a user database 634, and can cause content 632 to be determined by a content manager 626. A scene generation module 628, as may relate to an animation or gaming application, may generate or obtain content determined to be provided, where at least a portion of that content may need to be rendered using a rendering engine 630, if needed for this type of content or platform, and transmitted to client device 602 using an appropriate transmission manager 622 to send by download, streaming, or another such transmission channel. In at least one embodiment, this content 632 can include assets that can be used by a rendering engine to render a scene based on a determined scene graph or other such rendering guide. In at least one embodiment, client device 602 receiving this content can provide this content to a corresponding content application 604, which may also or alternatively include a scene generation module 612 or rendering engine 614 (if necessary) for rendering at least some of this content for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or content database 634, to client device 602. In at least one embodiment, at least a portion of this content can be obtained or streamed from another source, such as a third party content service 660 that may also include a content application 662 for generating or providing content. In at least one embodiment, portions of this functionality can be performed using multiple computing devices, or multiple processors within one or more computing devices, such as may include a combination of CPUs and GPUs.

In at least one embodiment, content application 624 includes a content manager 626 that can determine or analyze content before this content is transmitted to client device 602. In at least one embodiment, content manager 626 can also include, or work with, other components that are able to generate, modify, or enhance content to be provided. In at least one embodiment, this can include a rendering engine for rendering image or video content. In at least one embodiment, an image, video, or scene generation component 628 can be used to generate image, video, or other media content. In at least one embodiment, an enhancement component 630, which can also include a neural network, can perform one or more enhancements on this content, as discussed and suggested herein. In at least one embodiment, content manager 626 can cause this content (enhanced or not) to be transmitted to client device 602. In at least one embodiment, a content application 604 on client device 602 may also include components such as a rendering engine, image or video generator 612, and content enhancement module 614, such that any or all of this functionality can additionally, or alternatively, be performed on client device 602. In at least one embodiment, a content application 662 on a third party content service system 660 can also include such functionality. In at least one embodiment, locations where at least some of this functionality is performed may be configurable, or may depend upon factors such as a type of client device 602 or availability of a network connection with appropriate bandwidth, among other such factors. In at least one embodiment, a system for content generation can include any appropriate combination of hardware and software in one or more locations. In at least one embodiment, generated image or video content of one or more resolutions can also be provided, or made available, to other client devices 650, such as for download or streaming from a media source storing a copy of that image or video content. In at least one embodiment, this may include transmitting images of game content for a multiplayer game, where different client devices may display that content at different resolutions, including one or more super-resolutions.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Inference and Training Logic

Figure 7A:
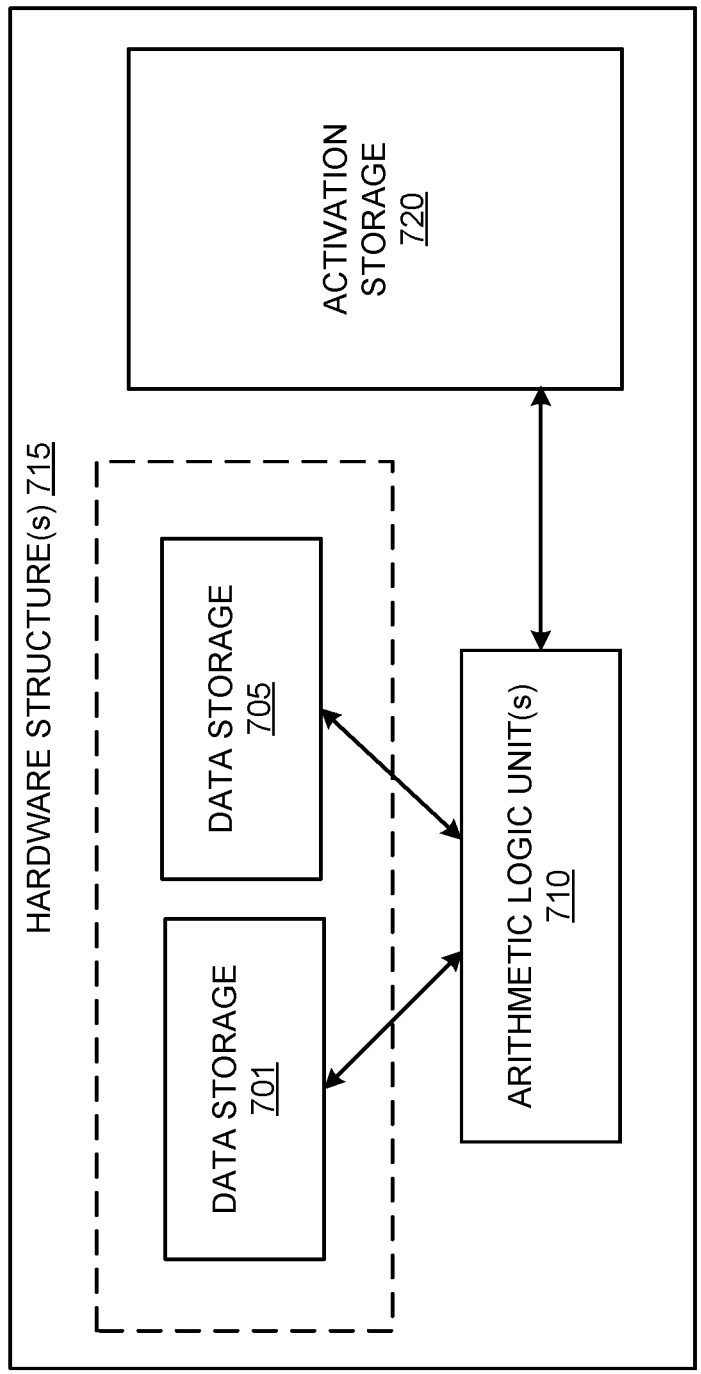
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
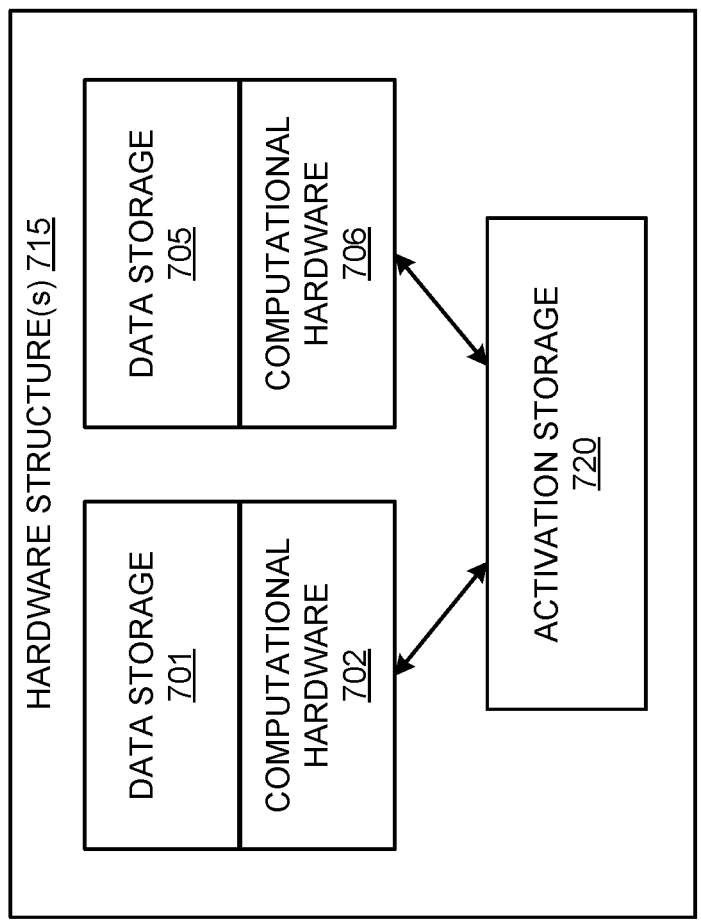
FIG. 7B illustrates inference and/or training logic, according to at least one embodiment.

FIG. 7B illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
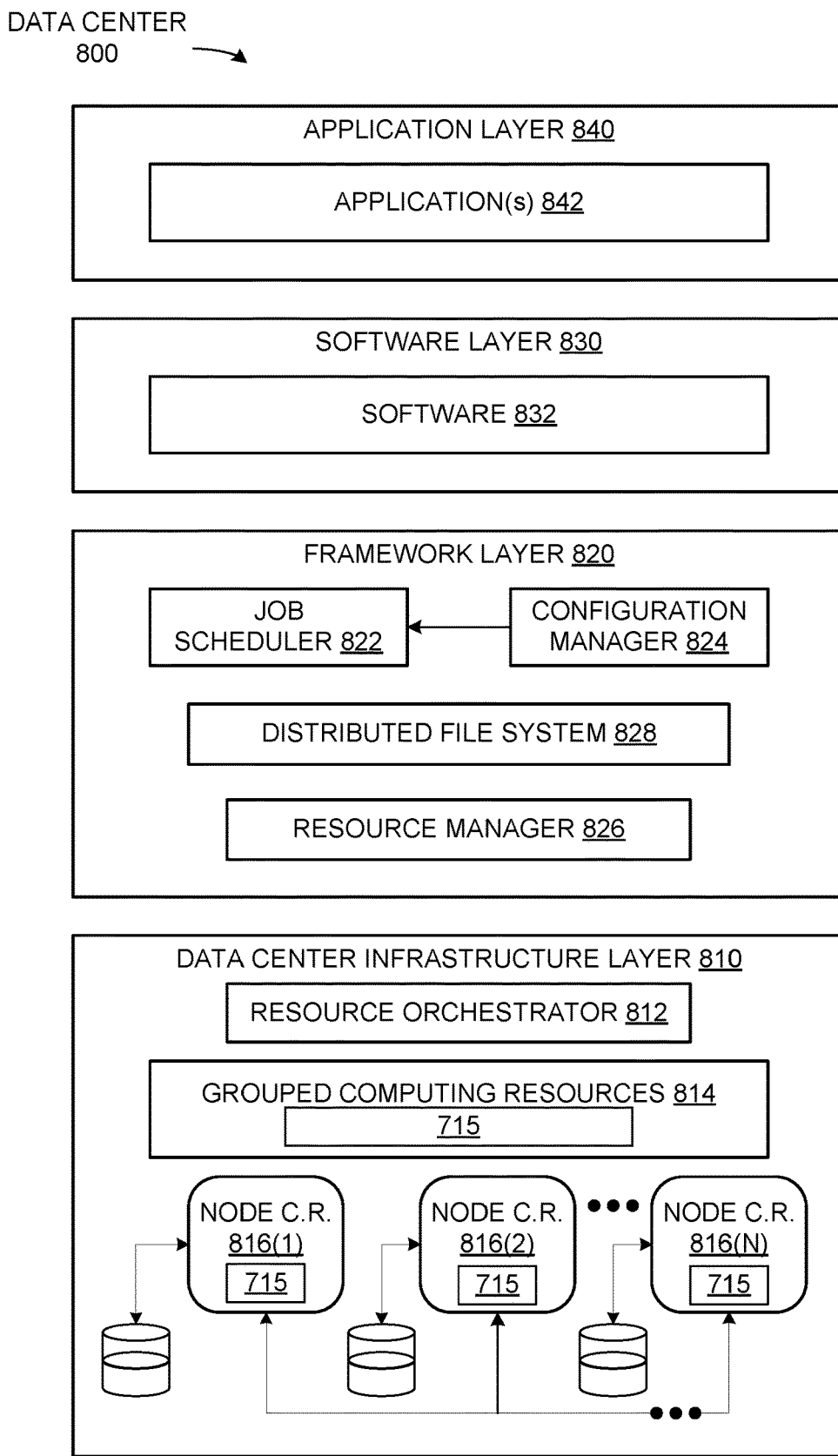
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may utilize distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underutilized and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or perform inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used to generate enhanced content, such as image or video content with upscaled resolution, reduced artifact presence, and visual quality enhancement.

Computer Systems

Figure 9:
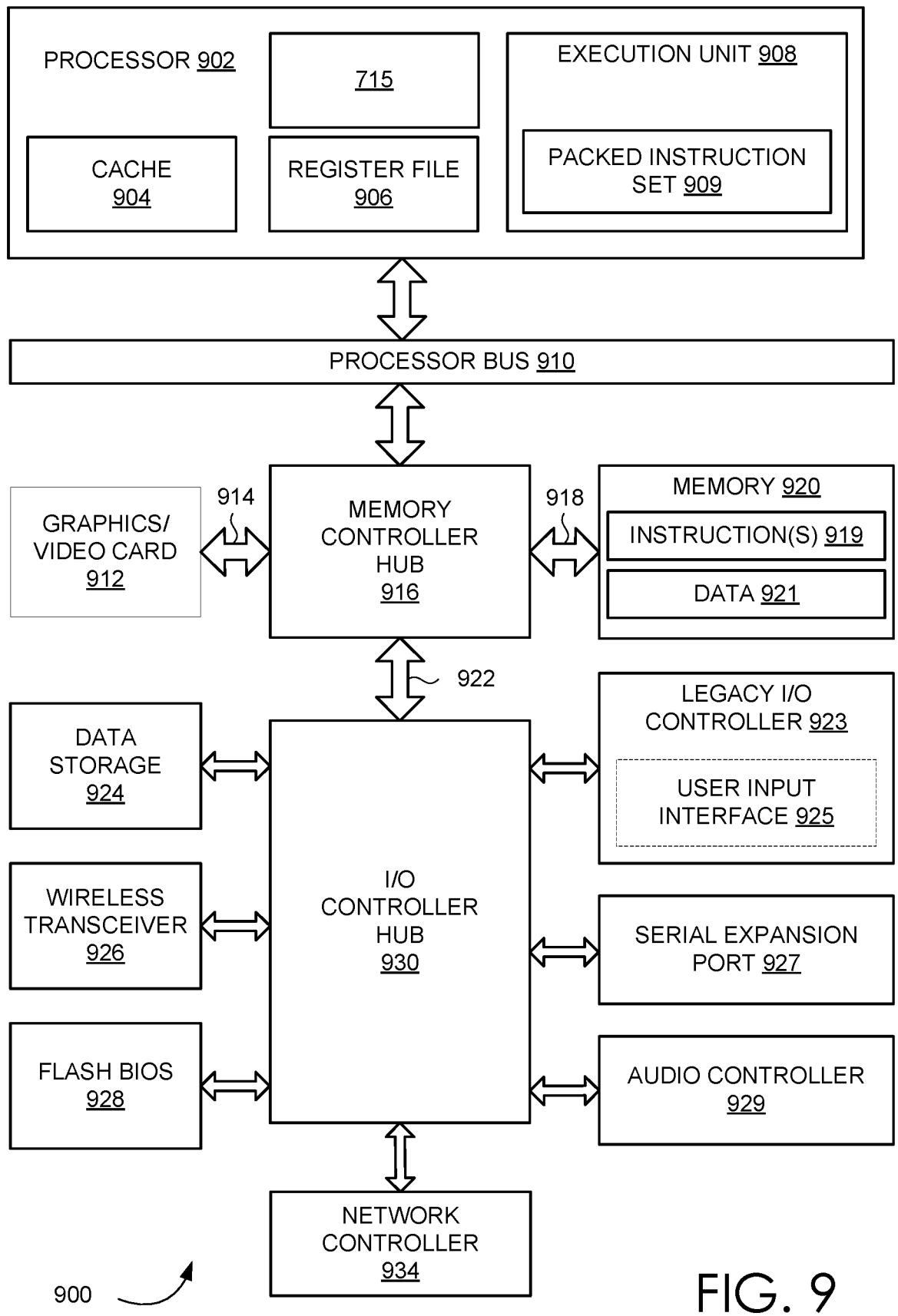
FIG. 9 illustrates a computer system, according to at least one embodiment.

FIG. 9 is a block diagram illustrating an exemplary computer system, which may be a system with interconnected devices and components, a system-on-a-chip (SOC) or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computer ("CISC") microprocessor, a reduced instruction set computing ("RISC") microprocessor, a very long instruction word ("VLIW")

microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used to generate enhanced content, such as image or video content with upscaled resolution, reduced artifact presence, and visual quality enhancement.

Figure 10:
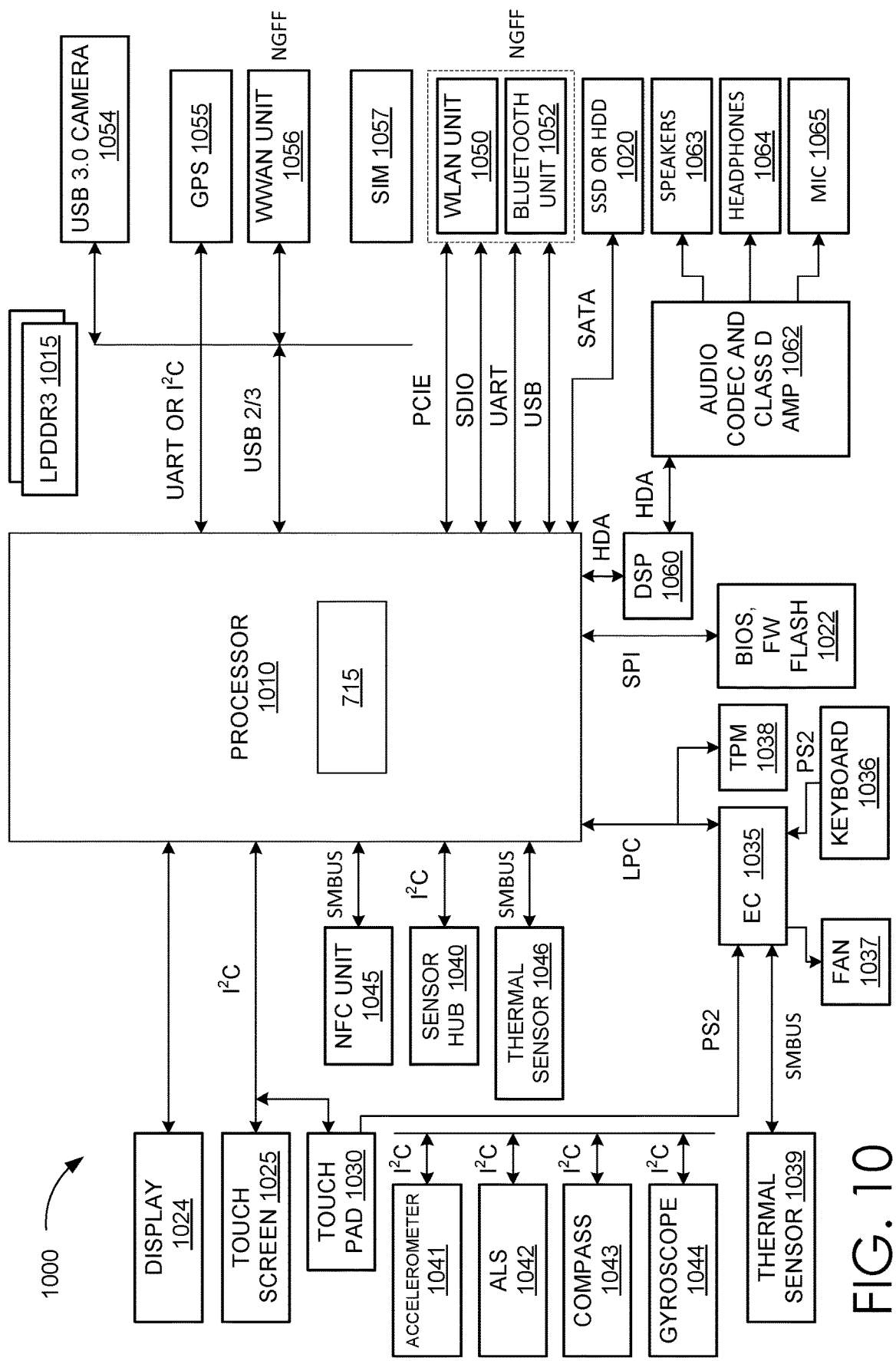
FIG. 10 illustrates a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, system 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1046, and a touch pad 1030 may be communicatively coupled to EC 1035. In at least one embodiment, speaker 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1064 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7a and/or 7b. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used to generate enhanced content, such as image or video content with upscaled resolution, reduced artifact presence, and visual quality enhancement.

Figure 11:
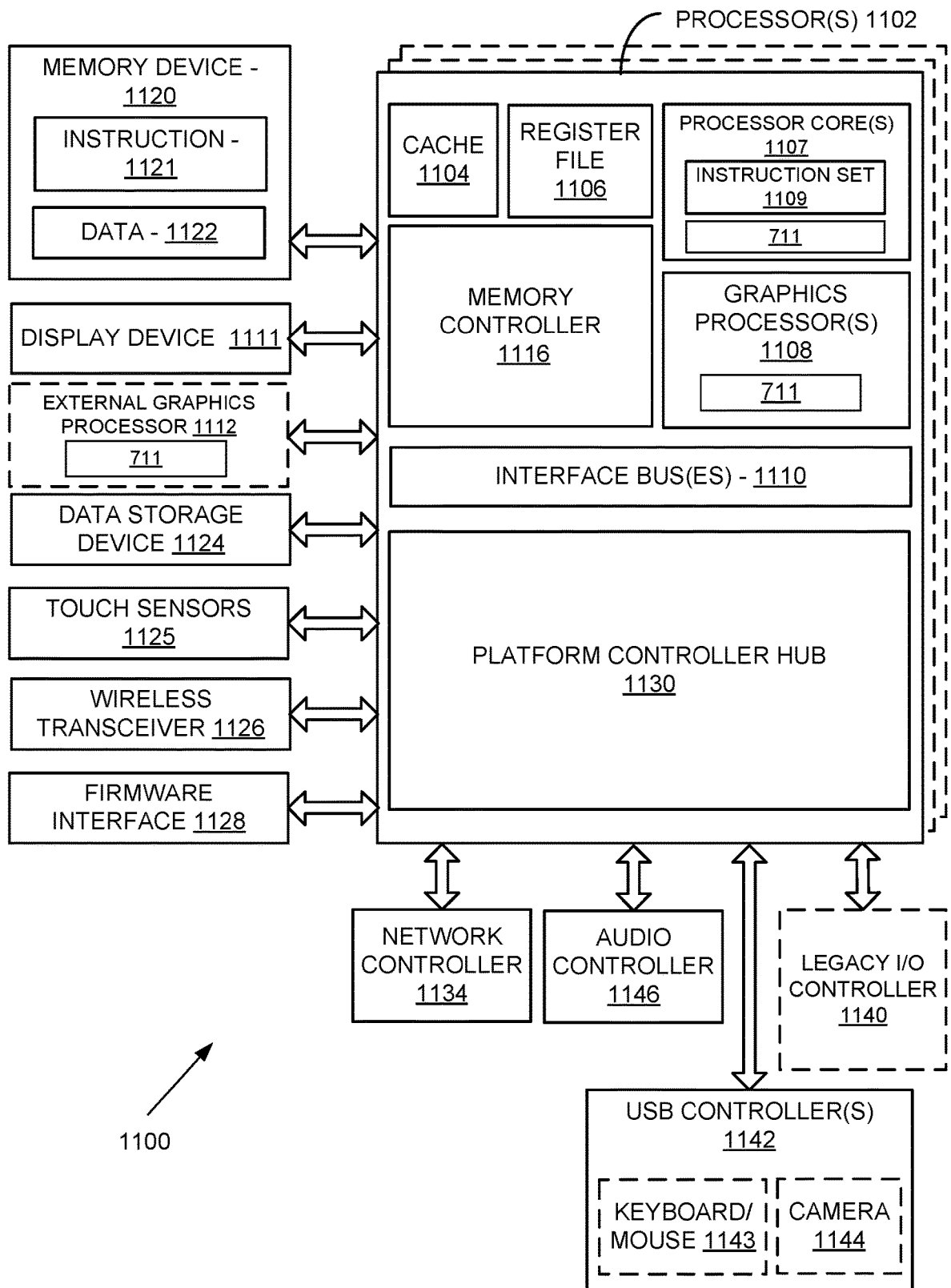
FIG. 11 illustrates at least portions of a graphics processor, according to one or more embodiments.

FIG. 11 is a block diagram of a processing system, according to at least one embodiment. In at least one embodiment, system 1100 includes one or more processors 1102 and one or more graphics processors 1108, and may be a single processor desktop system, a multiprocessor workstation system, or a server system having a large number of processors 1102 or processor cores 1107. In at least one embodiment, system 1100 is a processing platform incorporated within a system-on-a-chip (SoC) integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, couple with, or be integrated within a wearable device, such as a smart watch wearable device, smart eyewear device, augmented reality device, or virtual reality device. In at least one embodiment, processing system 1100 is a television or set top box device having one or more processors 1102 and a graphical interface generated by one or more graphics processors 1108.

In at least one embodiment, one or more processors 1102 each include one or more processor cores 1107 to process instructions which, when executed, perform operations for system and user software. In at least one embodiment, each of one or more processor cores 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor cores 1107 may each process a different instruction set 1109, which may include instructions to facilitate emulation of other instruction sets. In at least one embodiment, processor core 1107 may also include other processing devices, such a Digital Signal Processor (DSP).

In at least one embodiment, processor 1102 includes cache memory 1104. In at least one embodiment, processor 1102 can have a single internal cache or multiple levels of internal cache. In at least one embodiment, cache memory is shared among various components of processor 1102. In at least one embodiment, processor 1102 also uses an external cache (e.g., a Level-3 (L3) cache or Last Level Cache (LLC)) (not shown), which may be shared among processor cores 1107 using known cache coherency techniques. In at least one embodiment, register file 1106 is additionally included in processor 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor 1102 and other components in system 1100. In at least one embodiment, interface bus 1110, in one embodiment, can be a processor bus, such as a version of a Direct Media Interface (DMI) bus. In at least one embodiment, interface 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for system 1100, to store data 1122 and instructions 1121 for use when one or more processors 1102 executes an application or process. In at least one embodiment, memory controller 1116 also couples with an optional external graphics processor 1112, which may communicate with one or more graphics processors 1108 in processors 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 enables peripherals to connect to memory device 1120 and processor 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and can be, for example, a unified extensible firmware interface (UEFI). In at least one embodiment, network controller 1134 can enable a network connection to a wired network. In at least one embodiment, a high-performance network controller (not shown) couples with interface bus 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controllers 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 can include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used to generate enhanced content, such as image or video content with upscaled resolution, reduced artifact presence, and visual quality enhancement.

Figure 12:
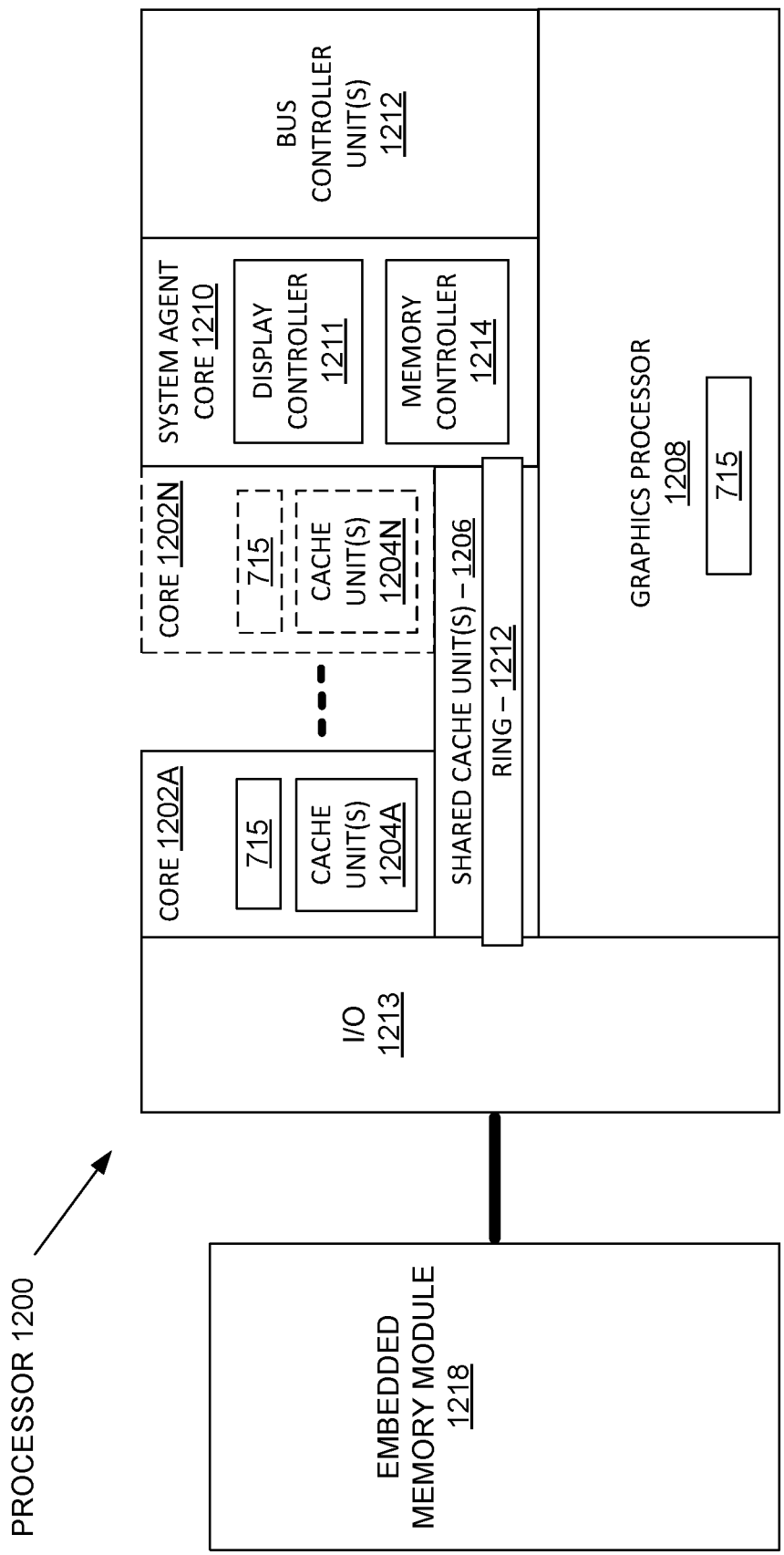
FIG. 12 illustrates at least portions of a graphics processor, according to one or more embodiments.

FIG. 12 is a block diagram of a processor 1200 having one or more processor cores 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor cores 1202A-1202N includes one or more internal cache units 1204A-1204N. In at least one embodiment, each processor core also has access to one or more shared cached units 1206.

In at least one embodiment, internal cache units 1204A-1204N and shared cache units 1206 represent a cache memory hierarchy within processor 1200. In at least one embodiment, cache memory units 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1206 and 1204A-1204N.

In at least one embodiment, processor 1200 may also include a set of one or more bus controller units 1216 and a system agent core 1210. In at least one embodiment, one or more bus controller units 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor cores 1202A-1202N include support for simultaneous multi-threading. In at least one embodiment, system agent core 1210 includes components for coordinating and operating cores 1202A-1202N during multi-threaded processing. In at least one embodiment, system agent core 1210 may additionally include a power control unit (PCU), which includes logic and components to regulate one or more power states of processor cores 1202A-1202N and graphics processor 1208.

In at least one embodiment, processor 1200 additionally includes graphics processor 1208 to execute graphics processing operations. In at least one embodiment, graphics processor 1208 couples with shared cache units 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring interconnect 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor cores 1202A-1202N and graphics processor 1208 use embedded memory modules 1218 as a shared Last Level Cache.

In at least one embodiment, processor cores 1202A-1202N are homogenous cores executing a common instruction set architecture. In at least one embodiment, processor cores 1202A-1202N are heterogeneous in terms of instruction set architecture (ISA), where one or more of processor cores 1202A-1202N execute a common instruction set, while one or more other cores of processor cores 1202A-1202N executes a subset of a common instruction set or a different instruction set. In at least one embodiment, processor cores 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Inference and/or training logic 715 are used to perform inferencing and/or training operations associated with one or more embodiments. Details regarding inference and/or training logic 715 are provided below in conjunction with FIGS. 7a and/or 7b. In at least one embodiment portions or all of inference and/or training logic 715 may be incorporated into processor 1200. For example, in at least one embodiment, training and/or inferencing techniques described herein may use one or more of ALUs embodied in graphics processor 1512, graphics core(s) 1202A-1202N, or other components in FIG. 12. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used to generate enhanced content, such as image or video content with upscaled resolution, reduced artifact presence, and visual quality enhancement.

Virtualized Computing Platform

Figure 13:
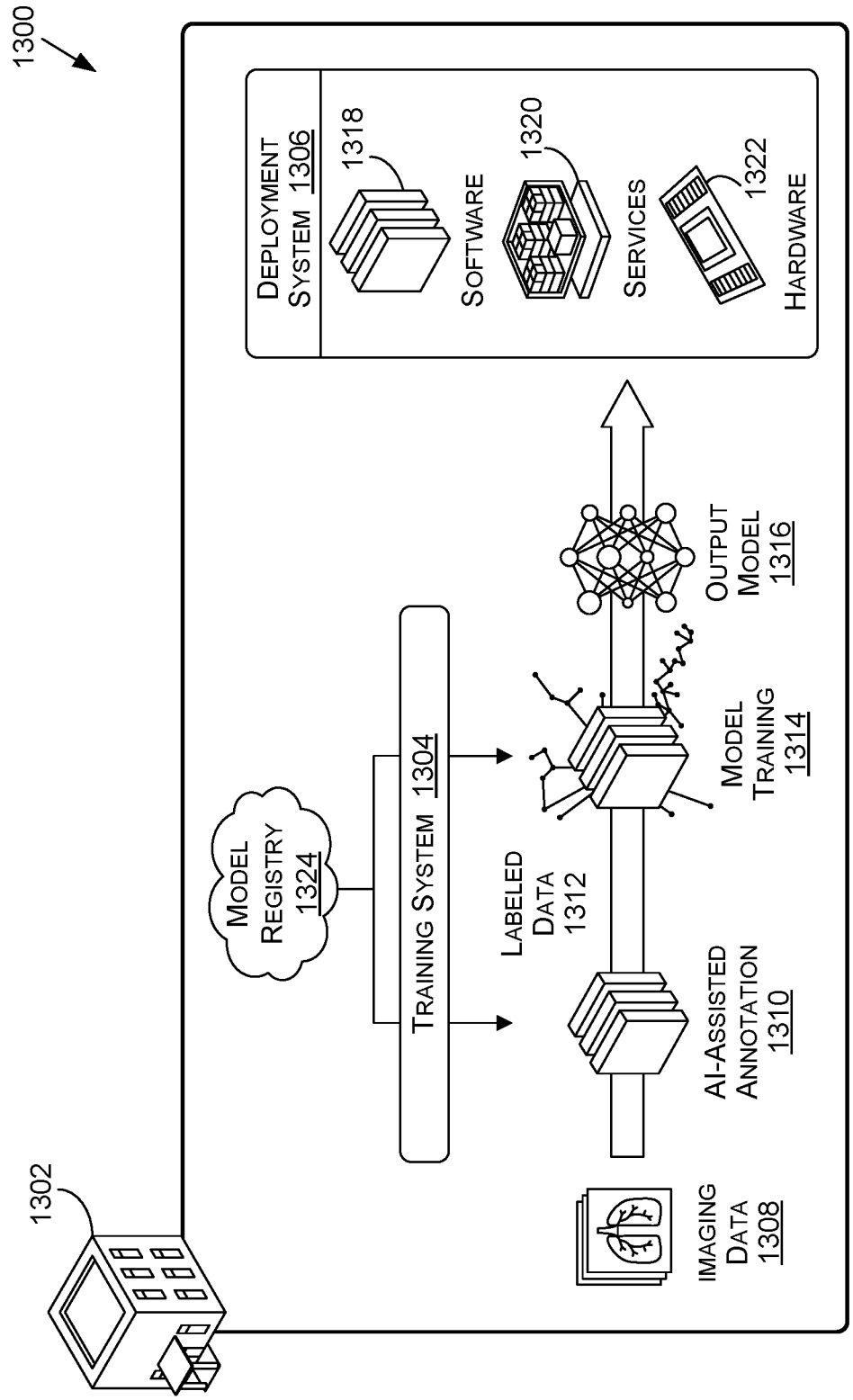
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facilities 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility 1302 using data 1308 (such as imaging data) generated at facility 1302 (and stored on one or more picture archiving and communication system (PACS) servers at facility 1302), may be trained using imaging or sequencing data 1308 from another facility (ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage (e.g., cloud 1426 of FIG. 14) compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1404 (FIG. 14) may include a scenario where facility 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotations 1310 may then be used directly, or may be adjusted or fine-tuned using an annotation tool to generate ground truth data. In at least one embodiment, AI-assisted annotations 1310, labeled clinic data 1312, or a combination thereof may be used as ground truth data for training a machine learning model. In at least one embodiment, a trained machine learning model may be referred to as output model 1316, and may be used by deployment system 1306, as described herein.

In at least one embodiment, training pipeline 1404 (FIG. 14) may include a scenario where facility 1302 needs a machine learning model for use in performing one or more processing tasks for one or more applications in deployment system 1306, but facility 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324— and referred to as output model 1316— and may be used in deployment system 1306 to perform one or more processing tasks for one or more applications of a deployment system.

In at least one embodiment, training pipeline 1404 (FIG. 14), a scenario may include facility 1302 requiring a machine learning model for use in performing one or more processing tasks for one or more applications in deployment system 1306, but facility 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotations 1310, labeled clinic data 1312, or a combination thereof—may be used as ground truth data for retraining or updating a machine learning model. In at least one embodiment, a trained machine learning model may be referred to as output model 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., system 1400 of FIG. 14). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1400 (e.g., for accuracy), an application may be available in a container registry for selection and/or implementation by a user to perform one or more processing tasks with respect to data at a facility (e.g., a second facility) of a user.

Figure 14:
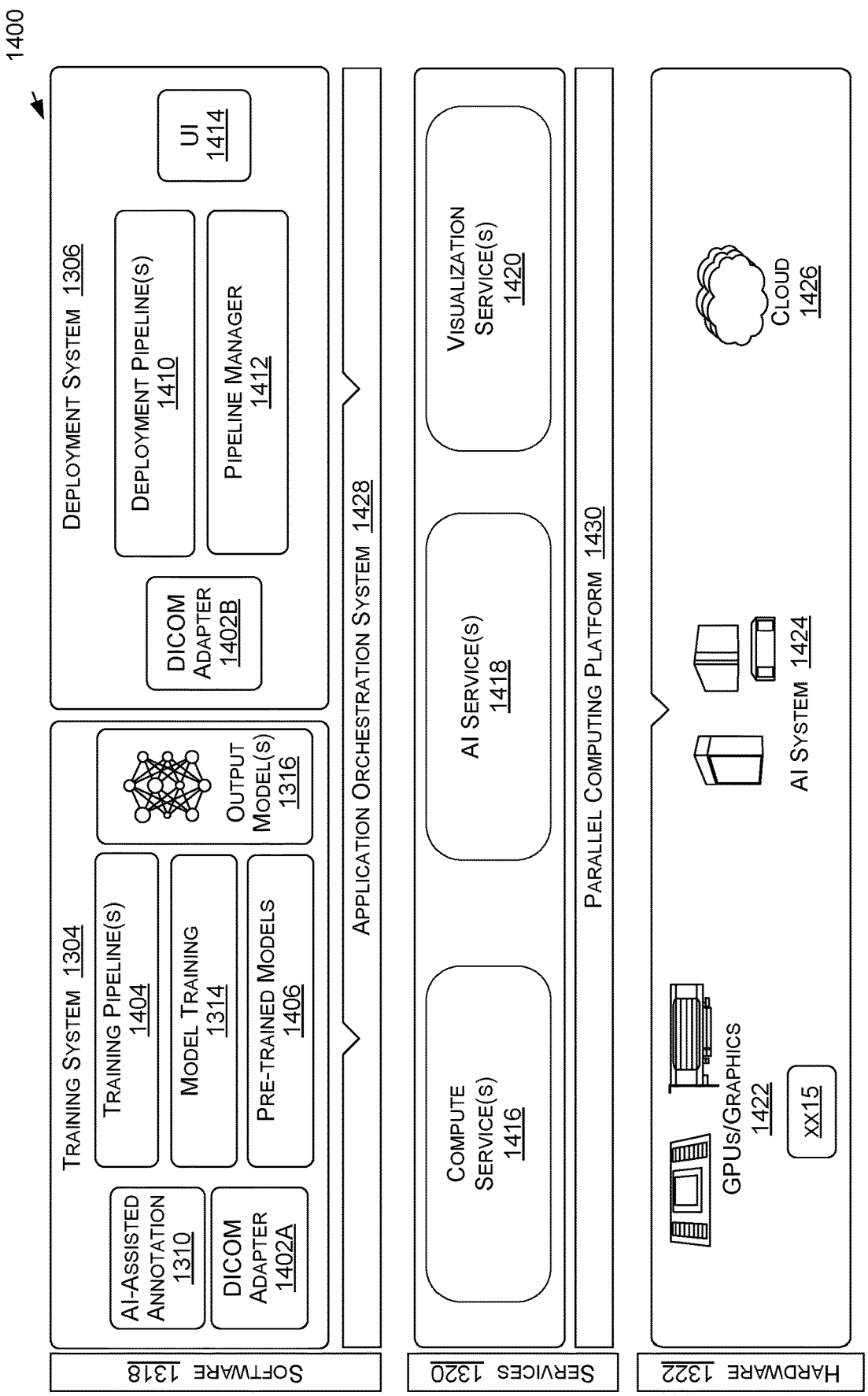
FIG. 14 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 1400 of FIG. 14). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform 1430 (FIG. 14)). In at least one embodiment, rather than each application that shares a same functionality offered by a service 1320 being required to have a respective instance of service 1320, service 1320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc. —to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipelines 1404, similar to those described herein with respect to FIG. 13. In at least one embodiment, where one or more machine learning models are to be used in deployment pipelines 1410 by deployment system 1306, training pipelines 1404 may be used to train or retrain one or more (e.g. pre-trained) models, and/or implement one or more of pre-trained models 1406 (e.g., without a need for retraining or updating). In at least one embodiment, as a result of training pipelines 1404, output model(s) 1316 may be generated. In at least one embodiment, training pipelines 1404 may include any number of processing steps, such as but not limited to imaging data (or other input data) conversion or adaption In at least one embodiment, for different machine learning models used by deployment system 1306, different training pipelines 1404 may be used. In at least one embodiment, training pipeline 1404 similar to a first example described with respect to FIG. 13 may be used for a first machine learning model, training pipeline 1404 similar to a second example described with respect to FIG. 13 may be used for a second machine learning model, and training pipeline 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naive Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 15A:
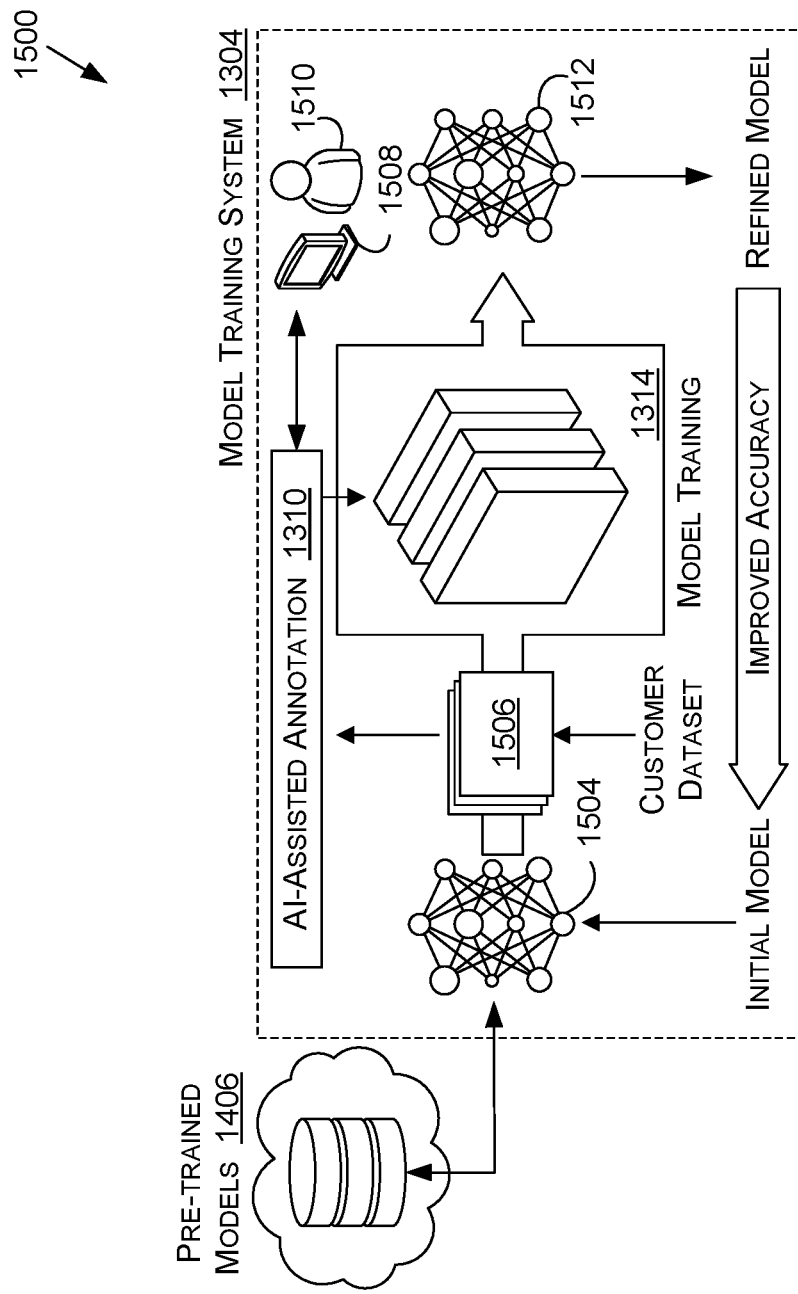
FIGS. 15A and 15B illustrate a data flow diagram for a process to train a machine learning model, as well as client-server architecture to enhance annotation tools with pre-trained annotation models, in accordance with at least one embodiment.
Figure 15B:
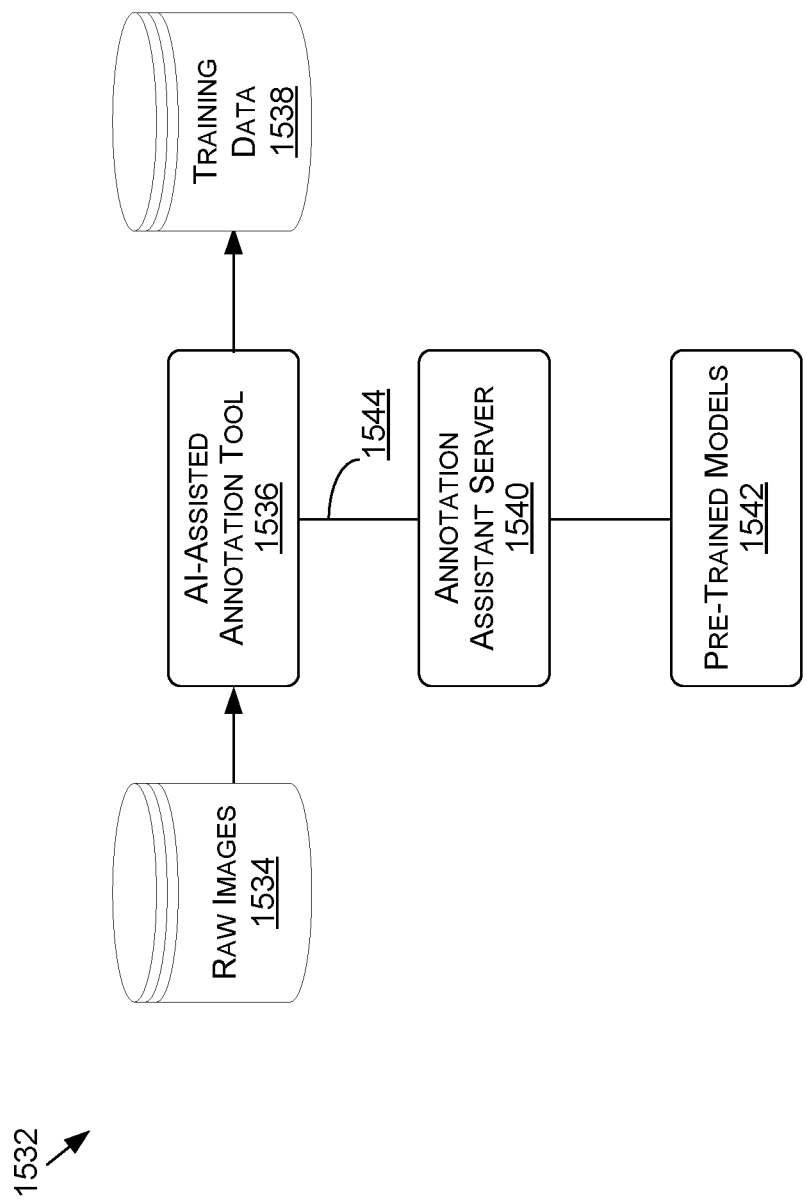

In at least one embodiment, training pipelines 1404 may include AI-assisted annotation, as described in more detail herein with respect to at least FIG. 15B. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation may be performed as part of deployment pipelines 1410; either in addition to, or in lieu of AI-assisted annotation included in training pipelines 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner.

In at least one embodiment, deployment system 1306 may execute deployment pipelines 1410. In at least one embodiment, deployment pipelines 1410 may include any number of applications that may be sequentially, non-sequentially, or otherwise applied to imaging data (and/or other data types) generated by imaging devices, sequencing devices, genomics devices, etc. —including AI-assisted annotation, as described above. In at least one embodiment, as described herein, a deployment pipeline 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1410 depending on information desired from data generated by a device. In at least one embodiment, where detections of anomalies are desired from an Mill machine, there may be a first deployment pipeline 1410, and where image enhancement is desired from output of an Mill machine, there may be a second deployment pipeline 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400— such as services 1320 and hardware 1322— deployment pipelines 1410 may be even more user friendly, provide for easier integration, and produce more accurate, efficient, and timely results.

In at least one embodiment, deployment system 1306 may include a user interface 1414 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, user interface 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to service 1320, and/or from application or service to hardware 1322. In at least one embodiment, although illustrated as included in software 1318, this is not intended to be limiting, and in some examples (e.g., as illustrated in FIG. 12cc) pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1320 leveraged by and shared by applications or containers in deployment system 1306 may include compute services 1416, AI services 1418, visualization services 1420, and/or other service types. In at least one embodiment, applications may call (e.g., execute) one or more of services 1320 to perform processing operations for an application. In at least one embodiment, compute services 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may enable general purpose computing on GPUs (GPGPU) (e.g., GPUs 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1418 may be leveraged to perform inferencing services for executing machine learning model(s) associated with applications (e.g., tasked with performing one or more processing tasks of an application). In at least one embodiment, AI services 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline (s) 1410 may use one or more of output models 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI services 1418.

In at least one embodiment, shared storage may be mounted to AI services 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization services 1420 may be leveraged to generate visualizations for viewing outputs of applications and/or deployment pipeline(s) 1410. In at least one embodiment, GPUs 1422 may be leveraged by visualization services 1420 to generate visualizations. In at least one embodiment, rendering effects, such as ray-tracing, may be implemented by visualization services 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1420 may include an internal visualizer, cinematics, and/or other rendering or image processing capabilities or functionality (e.g., ray tracing, rasterization, internal optics, etc.).

In at least one embodiment, hardware 1322 may include GPUs 1422, AI system 1424, cloud 1426, and/or any other hardware used for executing training system 1304 and/or deployment system 1306. In at least one embodiment, GPUs 1422 (e.g., NVIDIA's TESLA and/or QUADRO GPUs) may include any number of GPUs that may be used for executing processing tasks of compute services 1416, AI services 1418, visualization services 1420, other services, and/or any of features or functionality of software 1318. For example, with respect to AI services 1418, GPUs 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs 1422. In at least one embodiment, cloud 1426 may include a GPU-optimized platform for deep learning tasks. In at least one embodiment, AI system 1424 may use GPUs, and cloud 1426— or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system(s) 1424 for performing one or more of AI-based tasks of system 1400 (e.g., as a hardware abstraction and scaling platform). In at least one embodiment, cloud 1426 may integrate with application orchestration system 1428 leveraging multiple GPUs to enable seamless scaling and load balancing between and among applications and services 1320. In at least one embodiment, cloud 1426 may tasked with executing at least some of services 1320 of system 1400, including compute services 1416, AI services 1418, and/or visualization services 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services 1320 and/or hardware 1322 of system 1400, as described herein. In at least one embodiment, refined models 1512 generated by process 1500 may be executed by deployment system 1306 for one or more containerized applications in deployment pipelines 1410.

In at least one embodiment, model training 1314 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, or deleted, and/or replaced with an updated or new output or loss layer(s). In at least one embodiment, initial model 1504 may have previously fine-tuned parameters (e.g., weights and/or biases) that remain from prior training, so training or retraining 1314 may not take as long or require as much processing as training a model from scratch. In at least one embodiment, during model training 1314, by having reset or replaced output or loss layer(s) of initial model 1504, parameters may be updated and re-tuned for a new data set based on loss calculations associated with accuracy of output or loss layer(s) at generating predictions on new, customer dataset 1506 (e.g., image data 1308 of FIG. 13).

In at least one embodiment, pre-trained models 1406 may be stored in a data store, or registry (e.g., model registry 1324 of FIG. 13). In at least one embodiment, pre-trained models 1406 may have been trained, at least in part, at one or more facilities other than a facility executing process 1500. In at least one embodiment, to protect privacy and rights of patients, subjects, or clients of different facilities, pre-trained models 1406 may have been trained, on-premise, using customer or patient data generated on-premise. In at least one embodiment, pre-trained models 1406 may be trained using cloud 1426 and/or other hardware 1322, but confidential, privacy protected patient data may not be transferred to, used by, or accessible to any components of cloud 1426 (or other off premise hardware). In at least one embodiment, where a pre-trained model 1406 is trained at using patient data from more than one facility, pre-trained model 1406 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1406 on-premise and/or off premise, such as in a datacenter or other cloud computing infrastructure.

In at least one embodiment, when selecting applications for use in deployment pipelines 1410, a user may also select machine learning models to be used for specific applications. In at least one embodiment, a user may not have a model for use, so a user may select a pre-trained model 1406 to use with an application. In at least one embodiment, pre-trained model 1406 may not be optimized for generating accurate results on customer dataset 1506 of a facility of a user (e.g., based on patient diversity, demographics, types of medical imaging devices used, etc.). In at least one embodiment, prior to deploying pre-trained model 1406 into deployment pipeline 1410 for use with an application(s), pre-trained model 1406 may be updated, retrained, and/or fine-tuned for use at a respective facility.

In at least one embodiment, a user may select pre-trained model 1406 that is to be updated, retrained, and/or fine-tuned, and pre-trained model 1406 may be referred to as initial model 1504 for training system 1304 within process 1500. In at least one embodiment, customer dataset 1506 (e.g., imaging data, genomics data, sequencing data, or other data types generated by devices at a facility) may be used to perform model training 1314 (which may include, without limitation, transfer learning) on initial model 1504 to generate refined model 1512. In at least one embodiment, ground truth data corresponding to customer dataset 1506 may be generated by training system 1304. In at least one embodiment, ground truth data may be generated, at least in part, by clinicians, scientists, doctors, practitioners, at a facility (e.g., as labeled clinic data 1312 of FIG. 13).

In at least one embodiment, AI-assisted annotation 1310 may be used in some examples to generate ground truth data. In at least one embodiment, AI-assisted annotation 1310 (e.g., implemented using an AI-assisted annotation SDK) may leverage machine learning models (e.g., neural networks) to generate suggested or predicted ground truth data for a customer dataset. In at least one embodiment, user 1510 may use annotation tools within a user interface (a graphical user interface (GUI)) on computing device 1508.

In at least one embodiment, user 1510 may interact with a GUI via computing device 1508 to edit or fine-tune (auto)annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training 1314 to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines 1410 at a facility for performing one or more processing tasks with respect to medical imaging data.

In at least one embodiment, refined model 1512 may be uploaded to pre-trained models 1406 in model registry 1324 to be selected by another facility. In at least one embodiment, his process may be completed at any number of facilities such that refined model 1512 may be further refined on new datasets any number of times to generate a more universal model.

FIG. 15B is an example illustration of a client-server architecture 1532 to enhance annotation tools with pre-trained annotation models, in accordance with at least one embodiment. In at least one embodiment, AI-assisted annotation tools 1536 may be instantiated based on a client-server architecture 1532. In at least one embodiment, annotation tools 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation 1310, a deep learning model, for example, may receive this data as input and return inference results of a segmented organ or abnormality. In at least one embodiment, pre-instantiated annotation tools, such as AI-Assisted Annotation Tool 1536B in FIG. 15B, may be enhanced by making API calls (e.g., API Call 1544) to a server, such as an Annotation Assistant Server 1540 that may include a set of pre-trained models 1542 stored in an annotation model registry, for example. In at least one embodiment, an annotation model registry may store pre-trained models 1542 (e.g., machine learning models, such as deep learning models) that are pre-trained to perform AI-assisted annotation on a particular organ or abnormality. These models may be further updated by using training pipelines 1404. In at least one embodiment, pre-installed annotation tools may be improved over time as new labeled clinic data 1312 is added.

Such components can be used to generate enhanced content, such as image or video content with upscaled resolution, reduced artifact presence, and visual quality enhancement.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
   dividing a virtual environment, containing a surface to be rendered, into a plurality of voxels, at least one individual voxel of the plurality being associated with one or more feature vectors defining local segments of the surface;
   determining a set of query points corresponding to a subset of the plurality of voxels proximate the surface to be rendered;
   generating, from the feature vectors associated with the subset of the plurality of voxels, a set of summed feature vectors for the set of query points;
   determining, using one or more neural networks and based at least in part upon the set of summed feature vectors, one or more signed distance values for one or more query points of the set of query points; and
   rendering the surface using the one or more signed distance values.

2. The computer-implemented method of claim 1, further comprising:
   determining a subset of voxels of the plurality of voxels that contain at least a portion of the surface to be rendered; and
   generating a feature volume using the subset of voxels.

3. The computer-implemented method of claim 1, wherein the plurality of voxels correspond to one or more nodes of a hierarchical tree.

4. The computer-implemented method of claim 3, wherein the hierarchical tree is a sparse voxel octree (SVO).

5. The computer-implemented method of claim 4, further comprising:
   determining a level of detail (LOD) at which to render the surface, wherein a number of levels in the hierarchical tree is determined based at least in part upon the LOD.

6. The computer-implemented method of claim 1, wherein the determining the one or more signed distance values comprises using the one or more neural networks to compute one or more neural signed distance functions (SDFs) for the query points.

7. The computer-implemented method of claim 1, wherein rendering the surface occurs at an interactive display rate.

8. The computer-implemented method of claim 1, wherein the neural networks are used to represent surfaces other than those used to train the neural networks.

9. The computer-implemented method of claim 1, further comprising:
   performing sphere tracing inside the voxels corresponding to query points in order to determine one or more distance values.

10. A system comprising:
    one or more processors to execute operations comprising:
        divide a virtual environment containing a surface to be rendered into a plurality of voxels, at least one individual voxel of the plurality being associated with one or more feature vectors defining local segments of the surface;
        determine a set of query points corresponding to at least one voxel in a subset of the plurality of voxels and proximate the surface to be rendered,
        generate, from the feature vectors associated with the subset of the plurality of voxels, a set of summed feature vectors for the set of query points; and
        determine, using one or more neural networks to determine, from the set of summed feature vectors, one or more signed distance values; and
        utilizing the signed distance values to render the surface.

11. The system of claim 10, wherein the one or more processors are further to compute one or more neural signed distance functions (SDFs) for the query points using the one or more neural networks.

12. The system of claim 10, wherein the voxels corresponding to nodes of a hierarchical tree.

13. The system of claim 12, wherein the one or more processors are further to determine a level of detail (LOD) at which to render the surface, wherein a number of levels in the hierarchical tree is determined based at least in part upon the LOD.

14. The system of claim 10, wherein the one or more processors are further to perform sphere tracing inside one or more voxels corresponding to one or more query points in order to determine one or more distance values.

15. The system of claim 10, wherein the system comprises at least one of:
    a system for performing simulation operations;
    a system for performing simulation operations to test or validate autonomous machine applications;
    a system for rendering graphical output;
    a system for performing deep learning operations;
    a system implemented using an edge device;
    a system incorporating one or more Virtual Machines (VMs);
    a system implemented at least partially in a data center; or
    a system implemented at least partially using cloud computing resources.

16. A processor comprising:
    one or more processing units to divide a virtual environment containing a surface to be rendered, into a plurality of voxels, at least one individual voxel of the plurality being associated with one or more feature vectors defining local segments of the surface, determine a set of query points proximate the surface to be rendered and contained within one or more voxels of a subset of the plurality of voxels, generate, from the feature vectors associated with the subset of the plurality of voxels, a set of summed feature vectors for the set of query points, determine one or more signed distance values using one or more neural networks to determine and based on the set of summed feature vectors, decode the signed distance values to render the surface.

17. The processor of claim 16, wherein the one or more processing units are further to use neural networks to compute one or more neural signed distance functions (SDFs) for the set of query points.

18. The processor of claim 16, wherein the plurality of voxels correspond to nodes of a hierarchical tree.

19. The processor of claim 18, wherein the one or more processing units are further to determine a level of detail (LOD) at which to render the surface, wherein a number of levels in the hierarchical tree is determined based at least in part upon the LOD.

20. The processor of claim 16, wherein the one or more processing units are further to perform sphere tracing inside voxels containing one or more of the plurality of query points in order to determine the one or more distance values.

* * * * *